United States Patent
Veith et al.

(10) Patent No.: US 9,590,274 B2
(45) Date of Patent: Mar. 7, 2017

(54) IMPACT RESISTANT ELECTROLYTES

(71) Applicant: UT-Battelle, LLC, Oak Ridge, TN (US)

(72) Inventors: Gabriel M. Veith, Knoxville, TN (US); Beth L. Armstrong, Clinton, TN (US); Wyatt E. Tenhaeff, Rochester, NY (US); Nancy J. Dudney, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 302 days.

(21) Appl. No.: 14/497,667

(22) Filed: Sep. 26, 2014

(65) Prior Publication Data

US 2016/0093917 A1     Mar. 31, 2016

(51) Int. Cl.
| | |
|---|---|
| *H01M 10/26* | (2006.01) |
| *H01M 10/0567* | (2010.01) |
| *H01M 10/05* | (2010.01) |
| *H01M 10/42* | (2006.01) |
| *H01M 10/0569* | (2010.01) |
| *H01M 10/0568* | (2010.01) |
| *H01M 10/052* | (2010.01) |
| *H01M 10/054* | (2010.01) |
| *H01M 12/08* | (2006.01) |

(52) U.S. Cl.
CPC ....... *H01M 10/0567* (2013.01); *H01M 10/05* (2013.01); *H01M 10/4235* (2013.01); *H01M 10/052* (2013.01); *H01M 10/054* (2013.01); *H01M 10/0568* (2013.01); *H01M 10/0569* (2013.01); *H01M 12/08* (2013.01); *H01M 2300/0037* (2013.01)

(58) Field of Classification Search
CPC ............. H01M 10/0567; H01M 10/05; H01M 10/0569; H01M 10/0568; H01M 10/052; H01M 10/054; H01M 10/4235
See application file for complete search history.

(56) References Cited

U.S. PATENT DOCUMENTS

| | | |
|---|---|---|
| 7,825,045 B1 | 11/2010 | Wagner et al. |
| 2007/0178374 A1 | 8/2007 | Aizenberg et al. |

FOREIGN PATENT DOCUMENTS

| | | |
|---|---|---|
| JP | 2010129244 | 6/2010 |
| JP | 2012195259 | 10/2012 |
| WO | 2012081173 | 6/2012 |

OTHER PUBLICATIONS

Krzysztof Matyjaszewski, "Atom Transfer Radical Polymerization (ATRP): Current Status and Future Perspectives," Macromolecules, 2012, pp. 4015-4039, vol. 45.

G.H. Bogush, et al., "Preparation of Monodisperse Silica Particles: Control of Size and Mass Fraction," Journal of Non-Crystalline Solids, 1988, pp. 95-106, vol. 104.

*Primary Examiner* — Helen O Conley
(74) *Attorney, Agent, or Firm* — Joseph A. Marasco

(57) ABSTRACT

A passively impact resistant composite electrolyte composition includes an electrolyte solvent, up to 2M of an electrolyte salt, and shear thickening ceramic particles having a polydispersity index of no greater than 0.1, an average particle size of in a range of 50 nm to 1 μm, and an absolute zeta potential of greater than ±40 mV.

25 Claims, 26 Drawing Sheets

IMPACT RESISTANT ELECTROLYTES

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

BACKGROUND OF THE INVENTION

A challenge confronting the development and distribution of advanced high energy battery technology is the stability and safety of the electrolyte system. In currently manufactured advanced batteries, the electrolyte is usually comprised of aprotic organic liquids such as, for example, dimethyl carbonate, ethylene carbonate, and propylene carbonate. A problem with such electrolyte materials, beyond the well-known solid-electrolyte interface (SEI) issues, is volatility and flammability. An electrical short between the cathode and the anode generally results in a large amount of energy being released spontaneously. Such an energy release often leads to catastrophic combustion of the organic electrolyte and a fire. Such fires have resulted in expensive consumer recall, loss of consumer confidence, and the destruction of a nascent battery industry. The risk of fire has had a deleterious effect on widespread implementation of advanced batteries for automotive, aeronautic, and other applications. The remote chance that the safety mechanism, which consists of a porous polymer separator layer imbued with electrolyte, can fail must be eliminated as completely as possible.

BRIEF SUMMARY OF THE INVENTION

In accordance with one aspect of the present invention, the foregoing and other objects are achieved by a passively impact resistant composite electrolyte composition includes an electrolyte solvent, up to 2M of an electrolyte salt, and shear thickening ceramic particles having a polydispersity index of no greater than 0.1, an average particle size of in a range of 50 nm to 1 μm, and an absolute zeta potential of greater than ±40 mV.

In accordance with another aspect of the present invention, an impact-resistant laminated battery includes an anode; a cathode; and a passively impact resistant composite electrolyte disposed between the anode the cathode. The electrolyte includes a passively impact resistant composite electrolyte composition including an electrolyte solvent, up to 2M of an electrolyte salt, and shear thickening ceramic particles having a polydispersity index of no greater than 0.1, an average particle size of in a range of 50 nm to 1 μm, and an absolute zeta potential of greater than ±40 mV.

In accordance with a further aspect of the present invention, a method of making a passively impact resistant composite electrolyte composition includes the steps of: preparing shear thickening ceramic particles that have a polydispersity index of no greater than 0.1, an average particle size of in a range of 50 nm to 1 μm, and an absolute zeta potential of greater than ±40 mV; heat treating the shear thickening ceramic particles under negative pressure at a temperature of at least 80° C.; and combining the heat treated shear thickening ceramic particles with an electrolyte solvent and up to 2M of an electrolyte salt to make a composite electrolyte containing shear thickening ceramic particles in an amount in the range of 20 to 40 weight percent.

Figure 1:
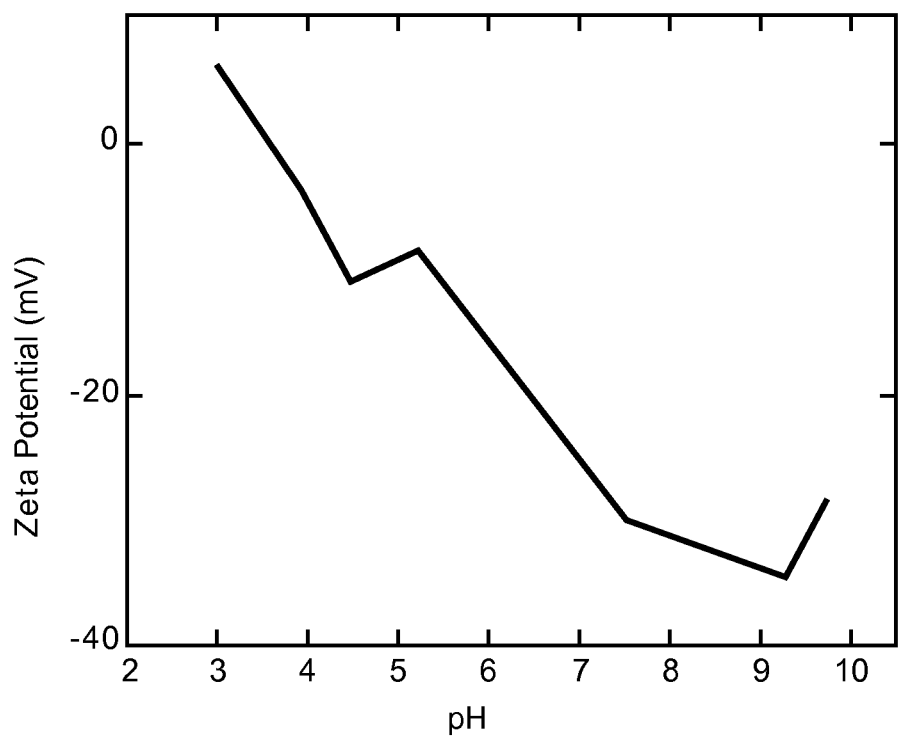
FIG. 1 is a graph showing zeta potential measured for fumed silica (Aldrich 5505).

For a better understanding of the present invention, together with other and further objects, advantages and capabilities thereof, reference is made to the following disclosure and appended claims in connection with the above-described drawings.

DETAILED DESCRIPTION OF THE INVENTION

Disclosed herein is a passively impact resistant composite electrolyte composition that undergoes a passive shear thickening phenomenon upon application of an external force, introducing a significant passive resistance against mechanical damage. Integration of a passive shear thickening effect and enhanced transport of a specific silica material into a liquid electrolyte provides greatly improved stability and safety. For example, a laminated battery cell can include the passively impact resistant composite electrolyte sandwiched between an anode and a cathode.

The passive shear thickening effect is not needed until the occurrence of an impact or intrusion upon a battery cell, which is generally caused by an external force. Passive shear thickening enables the material to form a solid barrier which prevents the cathode from touching the anode electrode, thus circumventing a potentially catastrophic electrical short. Since the effect is passive, there is generally no need for expensive electronic monitoring and no need to over-engineer a battery cell. Moreover, the liquid-like nature of the electrolyte enhances its compatibility with conventional battery cell manufacturing technology. The invention is applicable to sundry battery cell types, including, for example, those that employ lithium ion, sodium ion, and/or metal-air electrolyte systems.

The key component of the passively impact resistant composite electrolyte composition is a particulate shear thickening ceramic material. Examples of ceramic materials that will undergo shear thickening include, but are not limited to $TiO_2$, $Al_2O_3$, $ZrO_2$, $Y_2O_3$, $HfO_2$, $GeO_2$, $Sc_2O_3$, $CeO_2$, MgO, $SiO_2$, and combinations of any of the foregoing. It was discovered unexpectedly that specific particulate forms of ceramic materials have certain, identifiable, reproducible characteristics that produce the degree of shear thickening that is needed for battery safety technology, while also being suitable for adequate electrolyte functionality.

The shear thickening ceramic must be characterized by an essentially uniform (monodispersed) particle size, having a polydispersity index of no greater than 0.1, preferably no greater than 0.09, more preferably no greater than 0.07, most preferably no greater than 0.05. Average particle size of the shear thickening ceramic can vary from 50 nm to 1 μm, preferably 100 nm to 500 nm, more preferably from 150 nm to 300 nm.

The unpassivated shear thickening ceramic must also be characterized by a high surface charge, having a zeta potential greater than an absolute magnitude of ±40 mV, preferably greater than an absolute magnitude of ±50 mV, more preferably greater than an absolute magnitude of ±60 mV. The pH where surface charge is measured is nominally pH 7, but can vary with the isoelectric point of the oxide. The skilled artisan will recognize that the pH range can be adjusted as required for measuring zeta potential.

$SiO_2$ (also known as silica and silicon dioxide) made by the Stöber process as disclosed, for example, in Bogush et al. Journal of Non-crystalline solids, volume 104 (1988), pages 95-106, was found to be a suitable shear thickening ceramic for carrying out the present invention. The desired polydispersity can be obtained by controlling to reaction temperature, which should be in a range of −2 to 5° C., optimally 0° C. Hereinafter, the term "Stöber silica" is used to refer to silica thus made by the Stöber process.

Moreover, diatomaceous earth derived silica was also found to be suitable for carrying out the present invention.

Silica samples that did not have the necessary characteristics did not produce the required degree of shear thickening. In fact, shear thinning was observed in some tests, which are described in examples hereinbelow.

Silica, as obtained from suppliers or synthesis processes, generally has a coating of residue that is washed off with an alcohol or aqueous liquid prior to use. In order for the electrolyte composition to function properly, the silica must be free of volatile materials. Drying the silica in air at a temperature of at least 90° C. is preferred, while drying under negative pressure (for example, under vacuum) at a temperature of at least 120° C. is more preferred.

The surface of the shear thickening ceramic can be functionalized with various polymer groups to improve ionic conductivity (surface charge state) and/or reduce flocculation with no substantial effect on shear thickening. Examples of surface modifiers include, but are not limited to, stryenics, acrylates, methacrylates, vinyl esters, acrylamides, methacrylamides, acrylonitrile, N-vinyl carbazole, and N-vinyl pyrrolidone.

Conventional electrolyte additives may also be used; examples include, but are not limited to fluorinated ethylene carbonate, vinyl carbonate to promote solid electrolyte interface (SEI) formation on the anode or cathode with no substantial effect on shear thickening.

Any conventional lithium ion battery electrolyte solvent can be used for the electrolyte composition. Suitable electrolyte solvents include, but are not limited to, for example, ethylene carbonate, dimethyl carbonate, propylene carbonate, dimethoxyethane, dioxolane, ethyl methyl carbonate, various ionic liquids, and combinations of any of the foregoing. Examples of ionic liquids include, but are not limited to, for example, N-alkyl-N-methylpyrrolidinium bis(trifluoromethanesulfonyl)-imide, N-alkyl-N-methylpyrrolidinium bis(fluorosulfonyl)imide, and 1-ethyle-3-methyl-imidazolium bis(trifluoromethanesulfonyl)imide. A mixture of ethylene carbonate and dimethyl carbonate is often used as a solvent in preparing electrolytes, a commonly used mixture being 3:7 weight % ratio mixture of ethylene carbonate and dimethyl carbonate (for example, a mixture containing 30 grams ethylene carbonate and 70 grams dimethyl carbonate), referred to elsewhere herein as 3:7 EC/DMC.

Any conventional lithium ion battery electrolyte salt can be used for the electrolyte composition. Suitable electrolyte salts include, but are not limited to, for example, lithium hexafluorophosphate, lithium triflate, lithium perchlorate, lithium tetrafluoro borate, lithium hexafluoro lithium arsenate, lithium bis(trifluoromethane sulphone)imide, and lithium bis(oxalate) borate, and combinations of any of the foregoing. Sodium salts can also be used, and can include, for example, sodium perchlorate, sodium tetrafluoro borate, sodium hexafluoro arsenate, sodium bis(trifluoromethane sulphone)imide, sodium bis(oxalate) borate, and combinations of any of the foregoing.

The electrolyte composition, prepared by generally conventional methods, is an essentially homogeneous mixture comprising the silica and up to 2M of a selected salt in a selected solvent. The silica loading must be in an amount in the range of 10-50 wt. %, preferably 20-40 wt. %.

Electrodes described herein can be used with various conventional electrode systems. Anode materials can include, for example, graphite, Li, Si, Sn, $Cu_2Sb$, $Mo_3Sb_7$, Sb, $Cu_6Sn_5$, Al, Pt, Au, In, and the like. Cathode materials can include, for example, $LiNi_{1/3}Mn_{1/3}Co_{1/3}O_2$ (NMC), $LiCoO_2$, $Li(CoAl)_1O_2$, $Li_{1.2}(MnNiCo)_{0.8}O_2$ (AKA Lithium rich), $LiMn_2O_4$, $Li_2MnO_3$, $LiMn_{1.5}Ni_{0.5}O_4$, $LiFePO_4$, $LiCoPO_4$, $LiNiPO_4$, $LiNiO_2$, Li—V—O, $Li_2Si$—Mn, Fe, Ni—$O_4$, $NaFeO_2$, $NaCrO_2$, $Na(Fe,Mn,Ni,Co)O_2$, $Na_2(Ni,Fe,Mn)O_4$, and the like.

Preparation and Testing

General parameters were employed in preparing testing various embodiments described in the examples, which follow hereinbelow.

Samples of various forms of commercially available silica were washed with ethanol and dried under vacuum at temperatures between ambient (about 21° C.) and 120° C. 10-50 wt % Silica were dispersed in 3:7 EC/DMC containing between 0 and 1.2M $LiPF_6$. Mixtures were sonicated using a standard laboratory ultrasonic wand to ensure homogenous distributions.

Stöber derived silica sample batches were prepared using the procedure described hereinabove. The silica particles were grown at 0° C. After preparation the Silica was washed with ethanol and dried under vacuum at temperatures between ambient (about 21° C.) and 130° C. The resulting Silica powders were dispersed in 3:7 EC/DMC containing between 0 and 1.2M $LiPF_6$ to have 10-50 wt % Silica.

Electrochemical test cells were constructed using a standard $LiNi_{1/3}Mn_{1/3}Co_{1/3}O_2$ (NMC) cathode, and either a graphite (Gr) or lithium metal (Li) anode. Separators made of various materials, including glass fiber, polyacrylonitrile; polypropylene, or a mixture of polypropylene and polyethylene were disposed between the anodes and cathodes. To prepare a cell the electrolyte was added drop-wise to the separator which was placed between the cathode and anode electrodes. Cells tested were standard prismatic and coin cell designs. Other test cell designs such as a conventional design commonly known as test cell 18650, for example, could be used as well.

Rheological properties of electrolyte samples were tested using a conventional TA Instruments controlled-stress rheometer.

Example 1

A sample of fumed silica (Aldrich 5505) was dispersed in water and sonicated using a standard laboratory ultrasonic wand to ensure a homogenous distribution. The silica had a polydispersity of 0.156, as measured by light scattering. Zeta potential data of the silica is shown in FIG. 1.

Example 2

Figure 2:
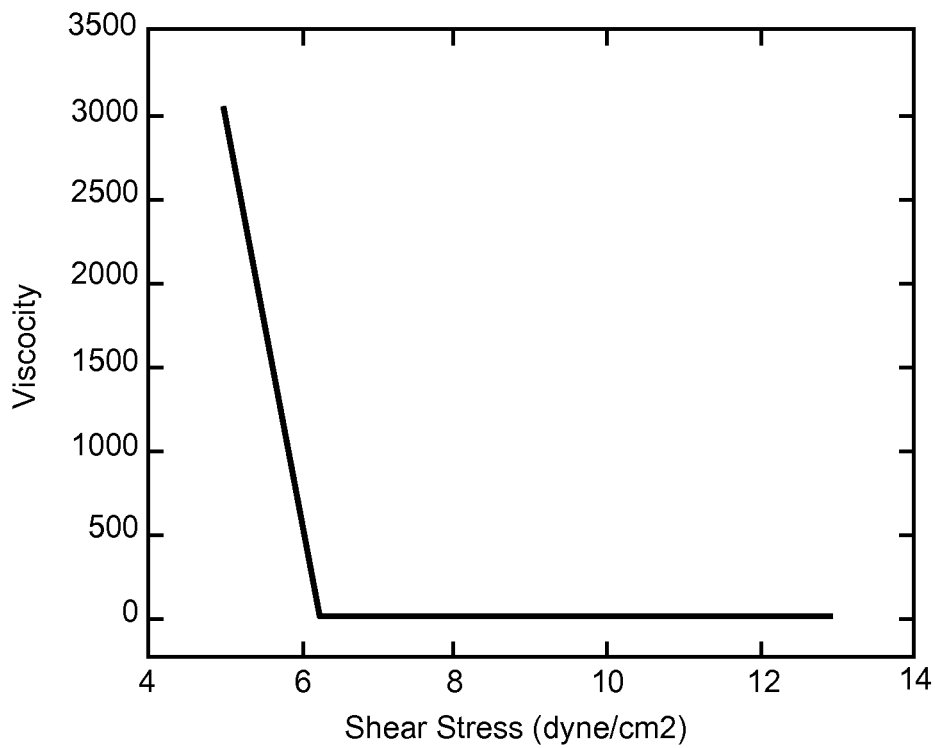
FIG. 2 is a graph showing a rheological profile of 10 wt % fumed silica (Aldrich 5505) in 3:7 weight % ratio mixture of ethylene carbonate and dimethyl carbonate (3:7 EC/DMC) containing 1.2 M $LiPF_6$.

A 10 wt. % mixture of fumed silica (Aldrich 5505) in a solution of 3:7 EC/DMC containing 1.2 M $LiPF_6$ was prepared and tested. The silica was characterized by a polydispersity of 0.156 as shown in Table 1. A rheological profile of the mixture is shown in FIG. 2.

Example 3

Figure 3:
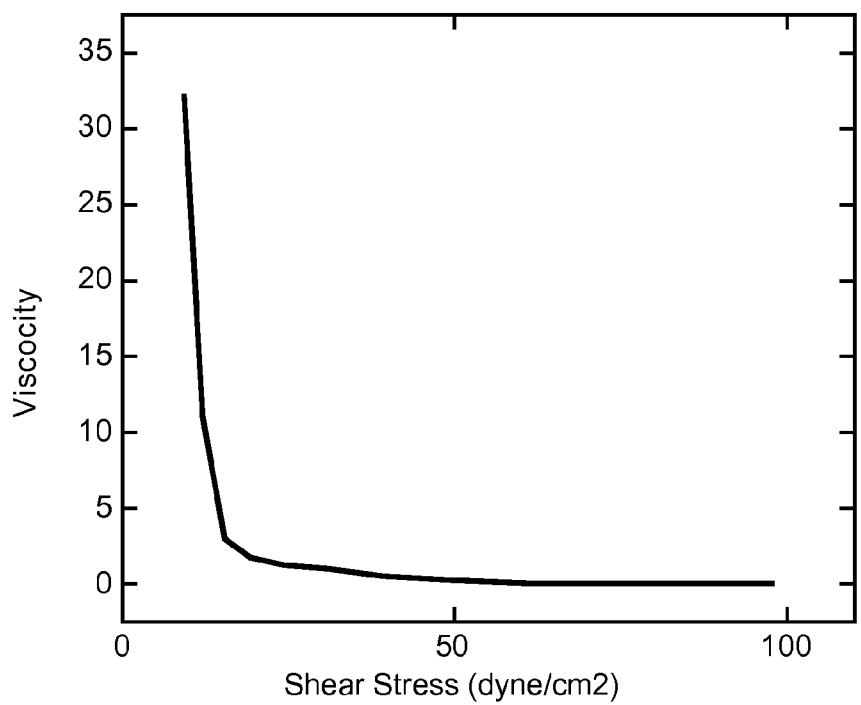
FIG. 3 is a graph showing a rheological profile of 20 wt % fumed silica (Aldrich 5505) in 3:7 EC/DMC containing 1.2 M $LiPF_6$.

A 20 wt. % mixture of fumed silica (Aldrich 5505) in a solution of 3:7 EC/DMC containing 1.2 M $LiPF_6$ was prepared and tested. A rheological profile of the mixture is shown in FIG. 3.

Example 4

Figure 4:
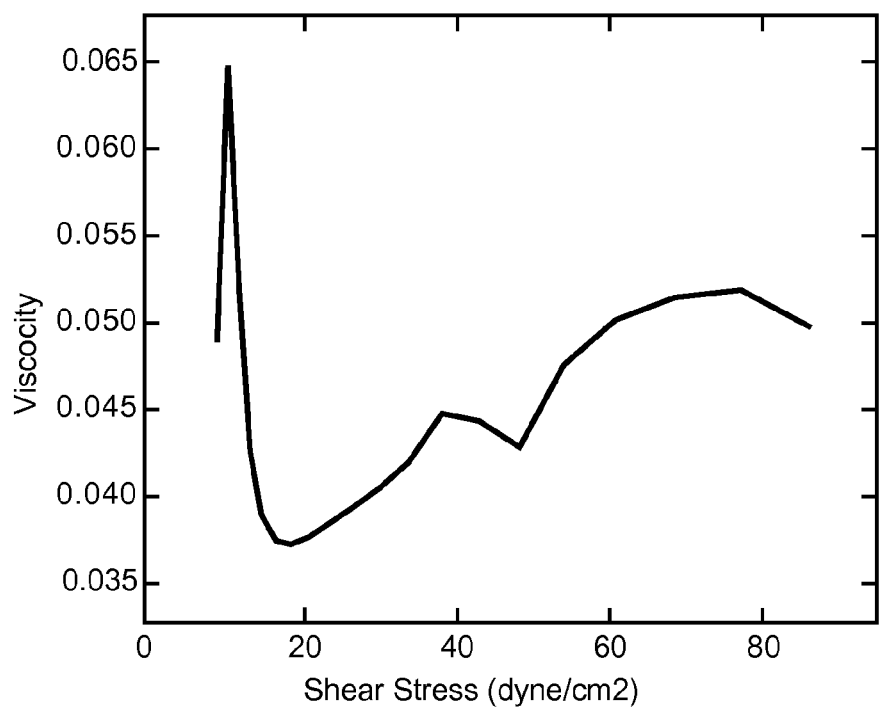
FIG. 4 is a graph showing a rheological profile of 30 wt % fumed silica (Aldrich 5505) in 3:7 EC/DMC containing 1.2 M $LiPF_6$.

A 30 wt. % mixture of fumed silica (Aldrich 5505) in a solution of 3:7 EC/DMC containing 1.2 M $LiPF_6$ was prepared and tested. A rheological profile of the mixture is shown in FIG. 4.

Example 5

Figure 5:
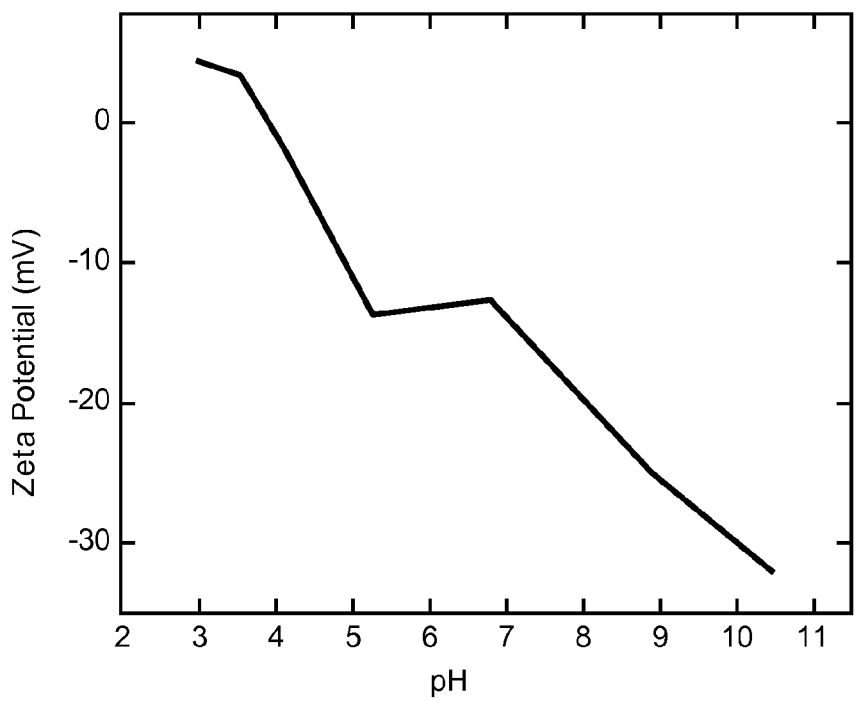
FIG. 5 is a graph showing zeta potential measured for fumed silica (Degussa R972).

A sample of fumed silica (Degussa R972) was dispersed in water and sonicated using a standard laboratory ultrasonic wand to ensure a homogenous distribution. The silica had a polydispersity of 0.160, as measured by light scattering. Zeta potential data of the silica is shown in FIG. 5.

Example 6

Figure 6:
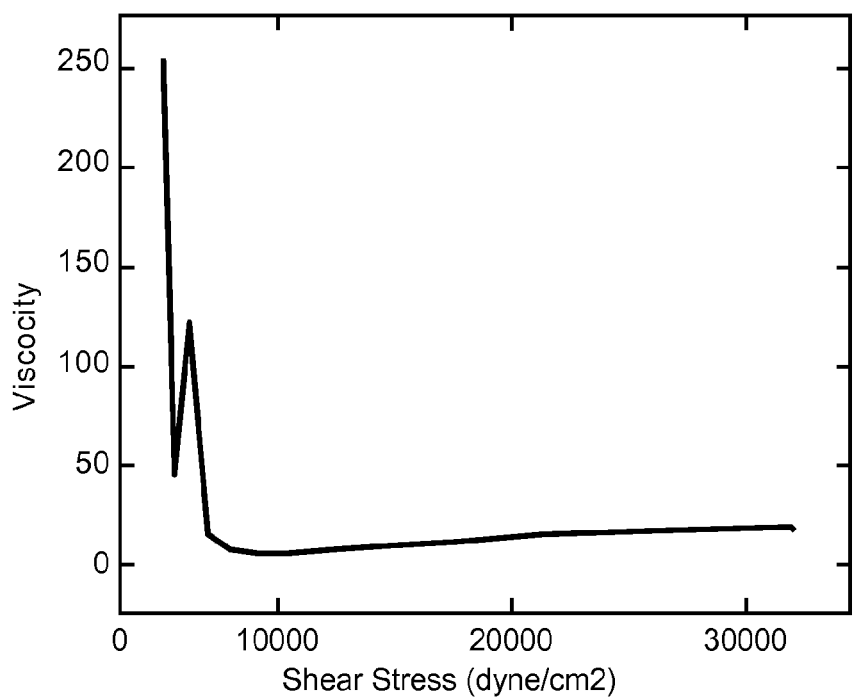
FIG. 6 is a graph showing a rheological profile of 10 wt % fumed silica (Degussa R972) in 3:7 EC/DMC containing 1.2 M $LiPF_6$.

A 10 wt. % mixture of fumed silica (Degussa R972) in a solution of 3:7 EC/DMC containing 1.2 M $LiPF_6$ was prepared and tested. A rheological profile of the mixture is shown in FIG. 6.

Example 7

Figure 7:
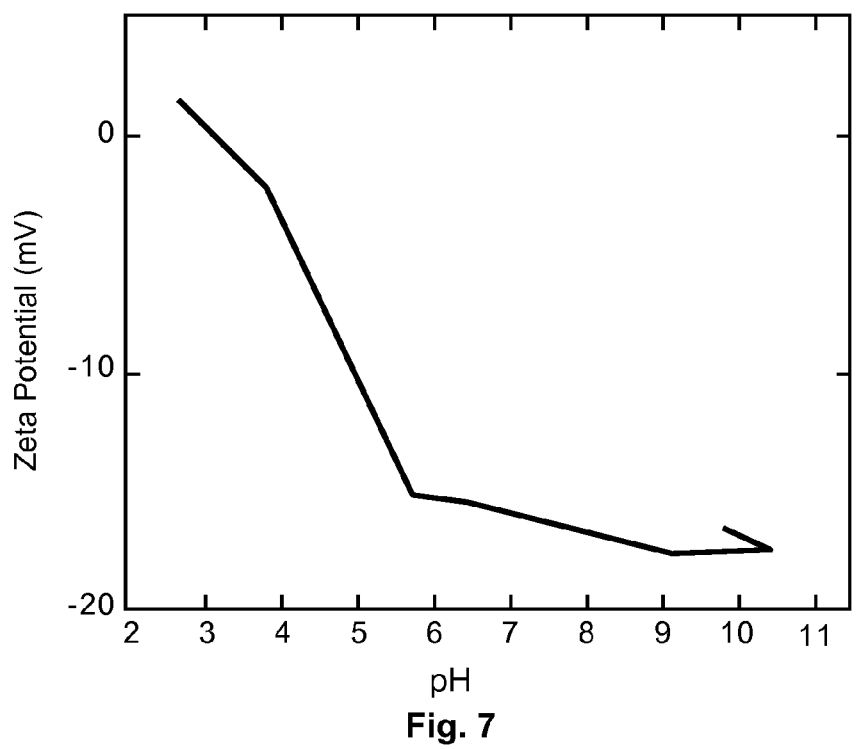
FIG. 7 is a graph showing zeta potential measured for fumed silica (Degussa A300).

A sample of fumed silica (Degussa A300) was dispersed in water. The silica had a polydispersity of 0.495, as measured by light scattering. Zeta potential data of the silica is shown in FIG. 7.

Example 8

Figure 8:
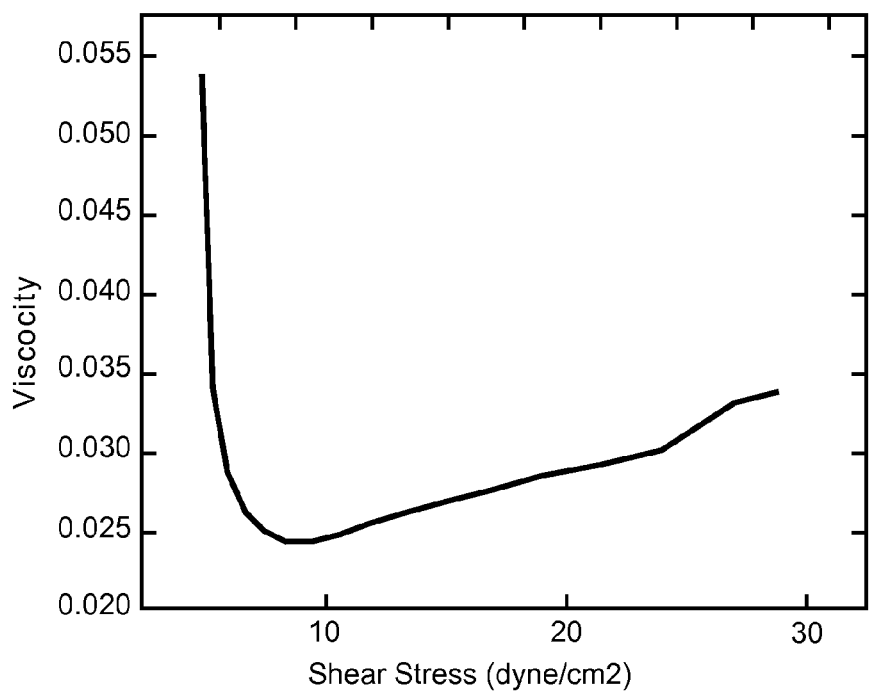
FIG. 8 is a graph showing a rheological profile of 10 wt % fumed silica (Degussa A300) in 3:7 EC/DMC containing 1.2 M $LiPF_6$.

A 10 wt. % mixture of fumed silica (Degussa A300) in a solution of 3:7 EC/DMC containing 1.2 M $LiPF_6$ was prepared and tested. A rheological profile of the mixture is shown in FIG. 8.

Example 9

Figure 9:
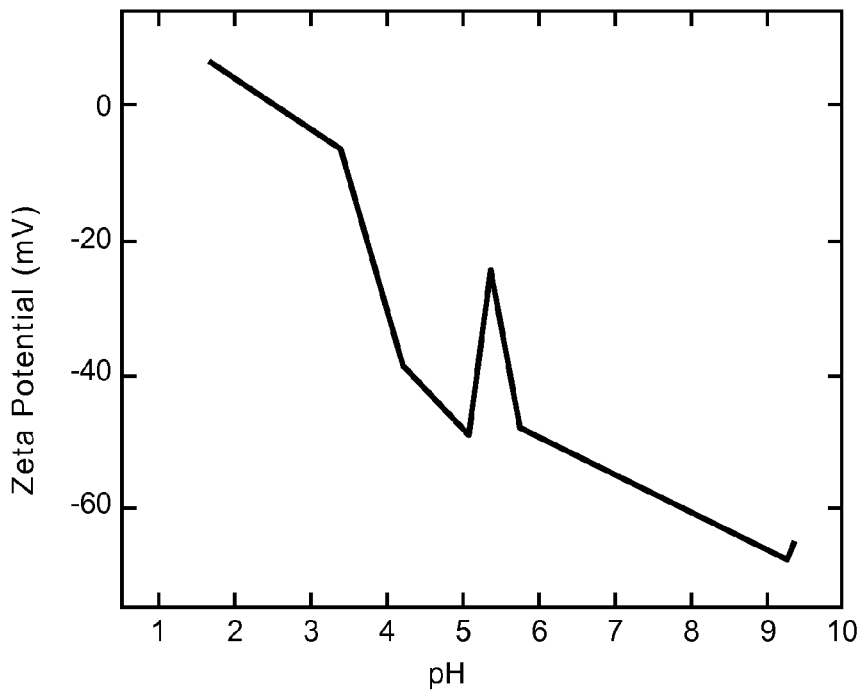
FIG. 9 is a graph showing zeta potential measured for Stöber silica batch 16.

Stöber silica batch 16 was prepared as described hereinabove; silica particles were initially grown at 0° C., but the temperature drifted upwardly to about 10° C. during the particle growth process. The particles were washed with ethanol and dried under vacuum at 100° C. Stöber silica batch 16 was dispersed in water and sonicated using a standard laboratory ultrasonic wand to ensure a homogenous distribution. The silica had a polydispersity of 0.243, as measured by light scattering. Zeta potential data of the silica is shown in FIG. 9.

Example 10

Figure 10:
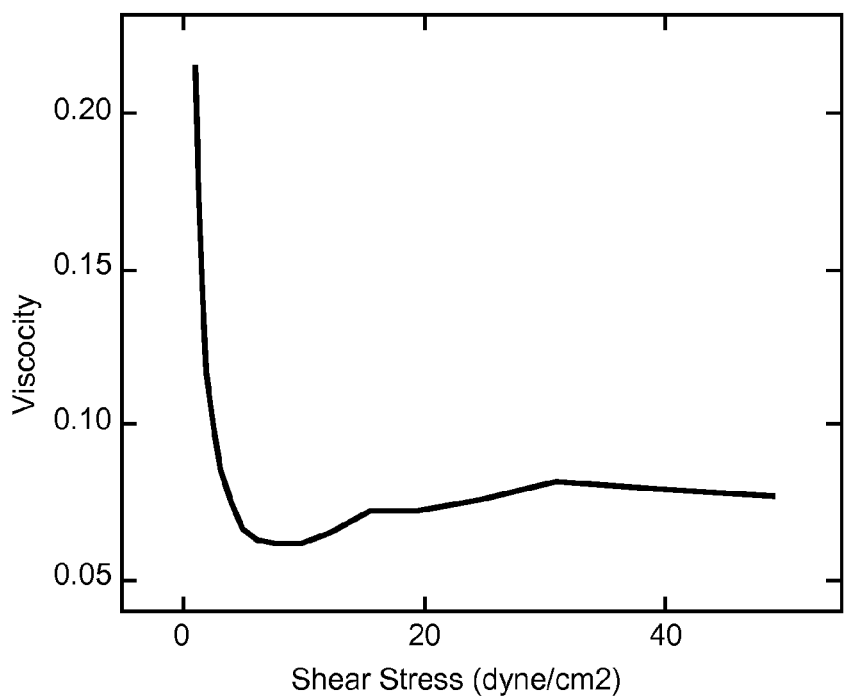
FIG. 10 is a graph showing a rheological profile of 10 wt % Stöber silica batch 16 in 3:7 EC/DMC containing 1.2 M $LiPF_6$.

A 10 wt. % mixture of Stöber silica batch 16 in a solution of 3:7 EC/DMC containing 1.2 M $LiPF_6$ was prepared and tested. A rheological profile of the mixture is shown in FIG. 10.

Example 11

Figure 11:
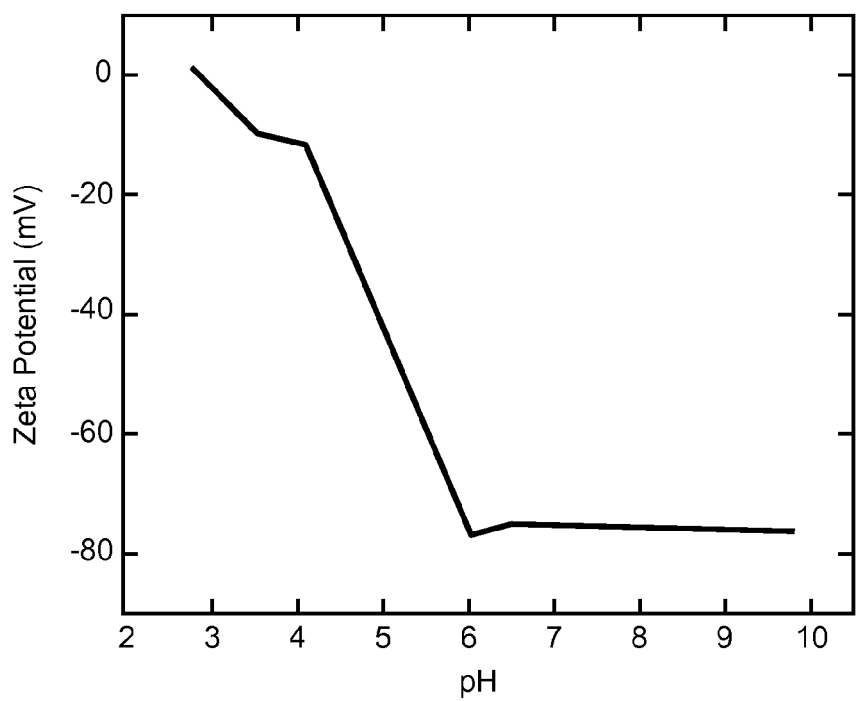
FIG. 11 is a graph showing zeta potential measured for Stöber silica batch 20.

Stöber silica batch 20 was prepared as described hereinabove; silica particles were grown at 0° C., but the temperature drifted upwardly to about 10° C. during the particle growth process. The particles were washed with ethanol and dried under vacuum at 100° C. Stöber silica batch 20 was dispersed in water. The silica had a polydispersity of 0.187, as measured by light scattering. Zeta potential data of the silica is shown in FIG. 11.

Example 12

Figure 12:
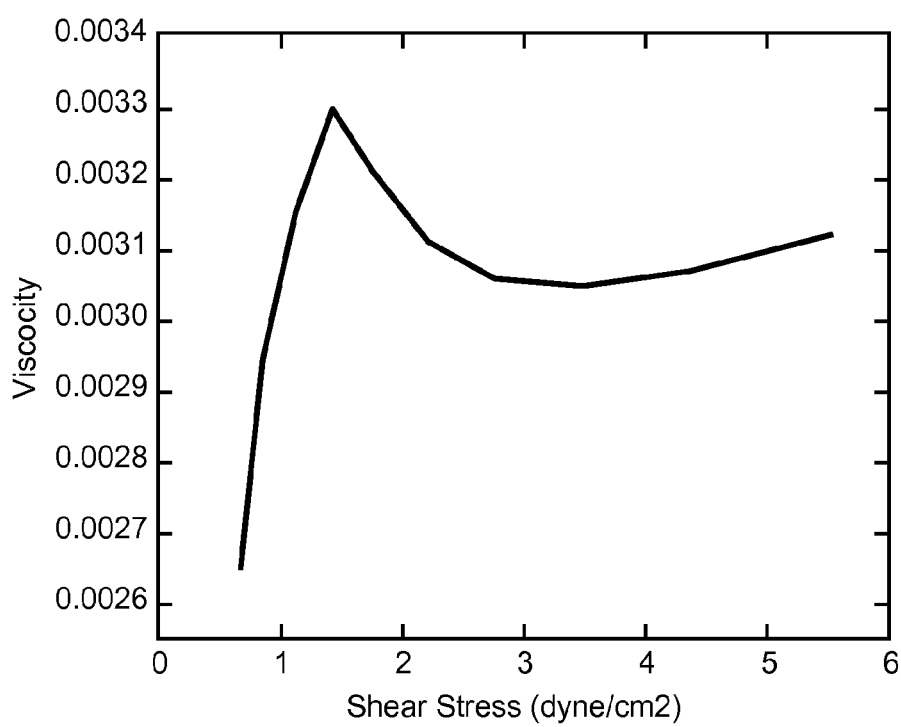
FIG. 12 is a graph showing a rheological profile of 10 wt % Stöber silica batch 20 in 3:7 EC/DMC containing 1.2 M $LiPF_6$.

A 10 wt. % mixture of Stöber silica batch 20 in a solution of 3:7 EC/DMC containing 1.2 M $LiPF_6$ was prepared and tested. A rheological profile of the mixture is shown in FIG. 12.

Example 13

Figure 13:
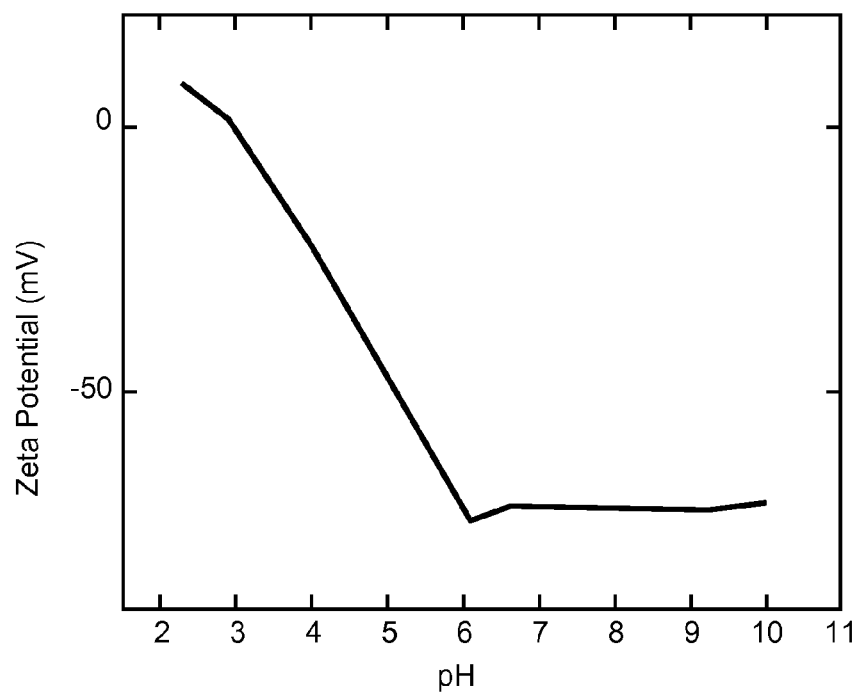
FIG. 13 is a graph showing zeta potential measured for Stöber silica batch 6.

Stöber silica batch 6 was prepared as described hereinabove; silica particles were grown at 0° C., washed with ethanol and dried under vacuum at 100° C. Stöber silica batch 6 was dispersed in water. The silica had a polydispersity of 0.087, as measured by light scattering. Zeta potential data of the silica is shown in FIG. 13.

Example 14

Figure 14:
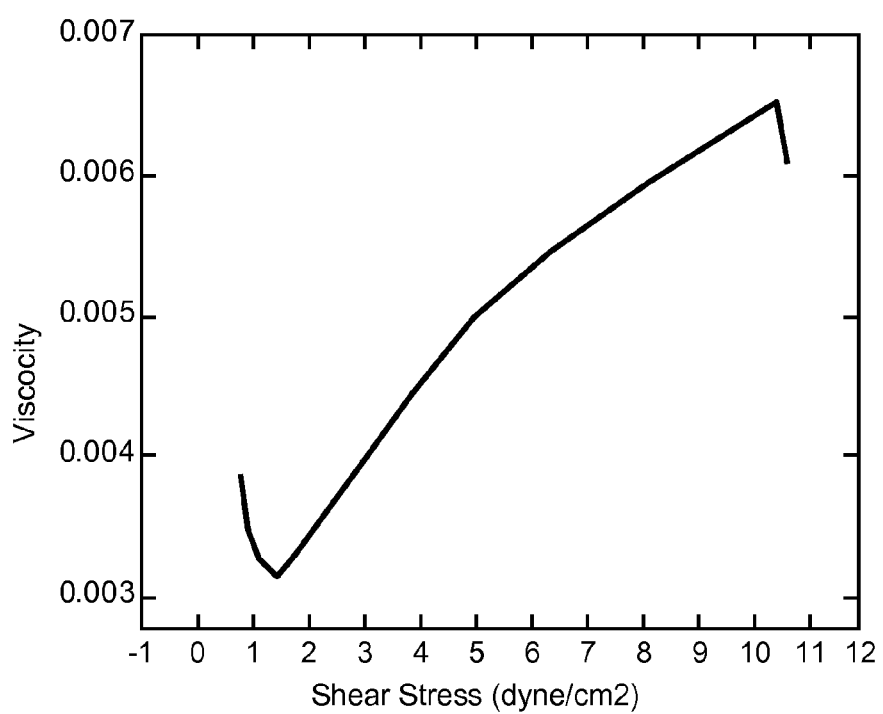
FIG. 14 is a graph showing a rheological profile of 10 wt % Stöber silica batch 6 in 3:7 EC/DMC containing 1.2 M $LiPF_6$.

A 10 wt. % mixture of Stöber silica batch 6 in a solution of 3:7 EC/DMC containing 1.2 M $LiPF_6$ was prepared and tested. A rheological profile of the mixture is shown in FIG. 14.

Example 15

Figure 15:
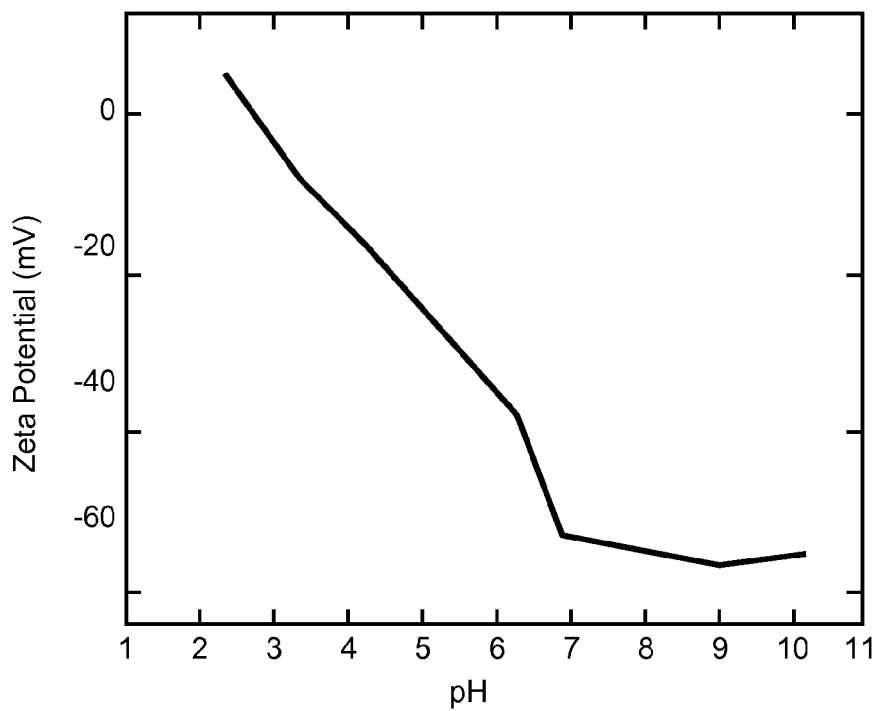
FIG. 15 is a graph showing zeta potential measured for Stöber silica batch 7.

Stöber silica batch 7 was prepared as described hereinabove; silica particles were grown at 0° C., washed with ethanol and dried under vacuum at 100° C. Stöber silica batch 7 was dispersed in water. The silica had a polydispersity of 0.005, as measured by light scattering. Zeta potential data of the silica is shown in FIG. 15.

Example 16

Figure 16:
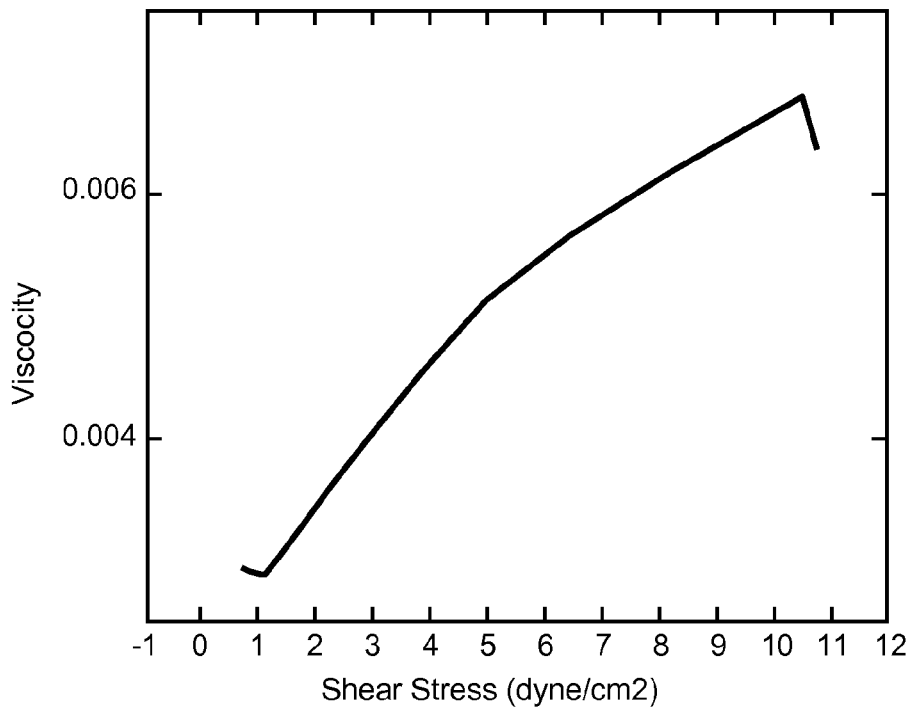
FIG. 16 is a graph showing a rheological profile of 10 wt % Stöber silica batch 7 in 3:7 EC/DMC containing 1.2 M $LiPF_6$.

A 10 wt. % mixture of Stöber silica batch 7 in a solution of 3:7 EC/DMC containing 1.2 M $LiPF_6$ was prepared and tested. A rheological profile of the mixture is shown in FIG. 16.

Example 17

Stöber silica batch 8 was prepared as described hereinabove; silica particles were grown at 0° C., washed with ethanol and dried under vacuum at 100° C. Stöber silica batch 8 was dispersed in water containing 1 wt % polyethylenimine (PEI) 10K MW. The silica had a polydispersity of 0.005, as measured by light scattering.

Example 18

Figure 17:
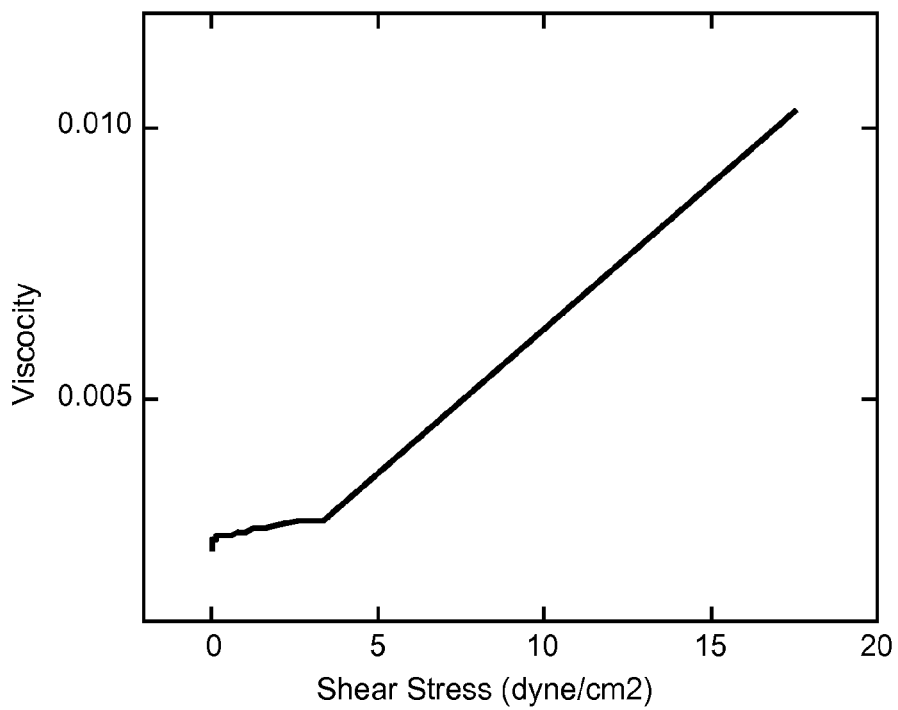
FIG. 17 is a graph showing a rheological profile of 10 wt % Stöber silica batch 8 in 3:7 EC/DMC containing 1.2 M $LiPF_6$.

A 10 wt. % mixture of Stöber silica batch 8 in a solution of 3:7 EC/DMC containing 1.2 M LiPF$_6$ was prepared and tested. A rheological profile of the mixture is shown in FIG. 17.

Example 19

Figure 18:
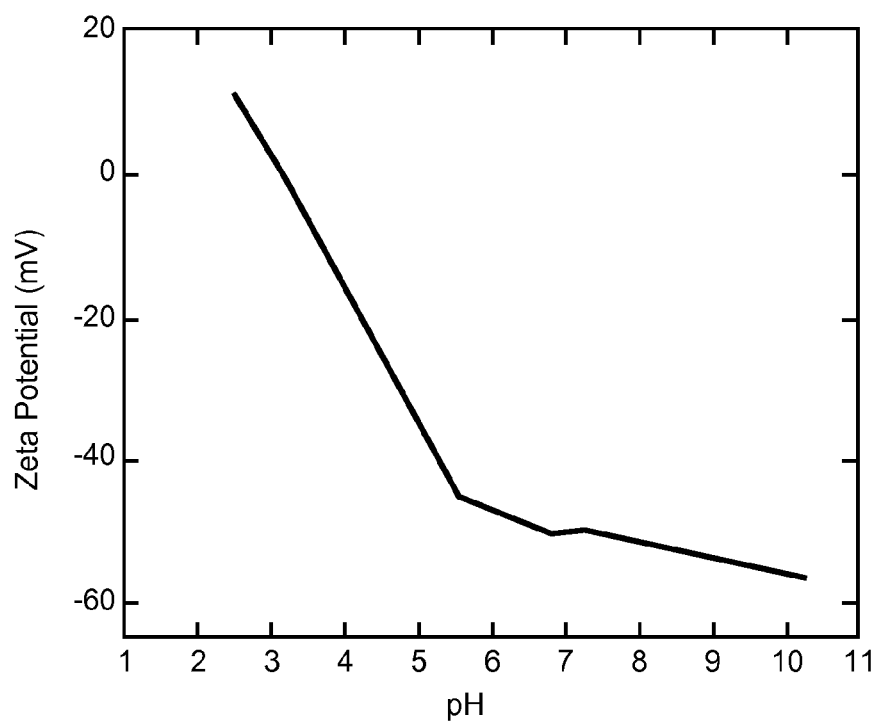
FIG. 18 is a graph showing zeta potential measured for Stöber silica batch 21.

Stöber silica batch 21 was prepared as described hereinabove; silica particles were grown at 0° C., washed with ethanol and dried under vacuum at 100° C. Stöber silica batch 21 was dispersed in water. The silica had a polydispersity of 0.005, as measured by light scattering. Zeta potential data of the silica is shown in FIG. 18.

Example 20

Figure 19:
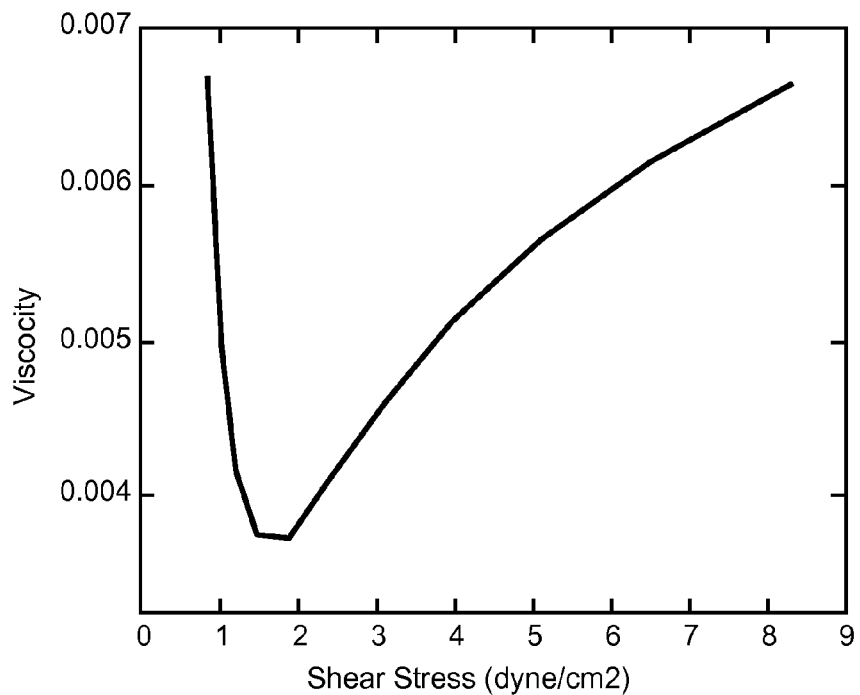
FIG. 19 is a graph showing a rheological profile of 10 wt % Stöber silica batch 21 in 3:7 EC/DMC containing 1.2 M $LiPF_6$.

A 10 wt. % mixture of Stöber silica batch 21 in a solution of 3:7 EC/DMC containing 1.2 M LiPF$_6$ was prepared and tested. A rheological profile of the mixture is shown in FIG. 19.

Example 21

Figure 20:
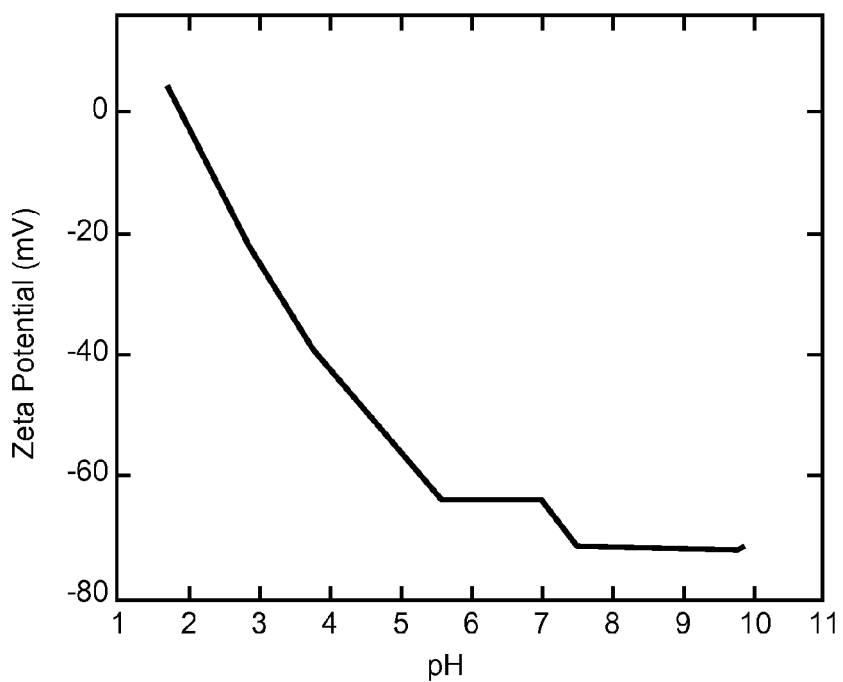
FIG. 20 is a graph showing zeta potential measured for silica (Alfa Aesar 400 mesh).

A sample of diatomaceous silica (Alfa Aesar 400 mesh) was dispersed in water. The silica had a polydispersity of 0.005, as measured by light scattering. Zeta potential data of the silica is shown in FIG. 20.

Example 22

Figure 21:
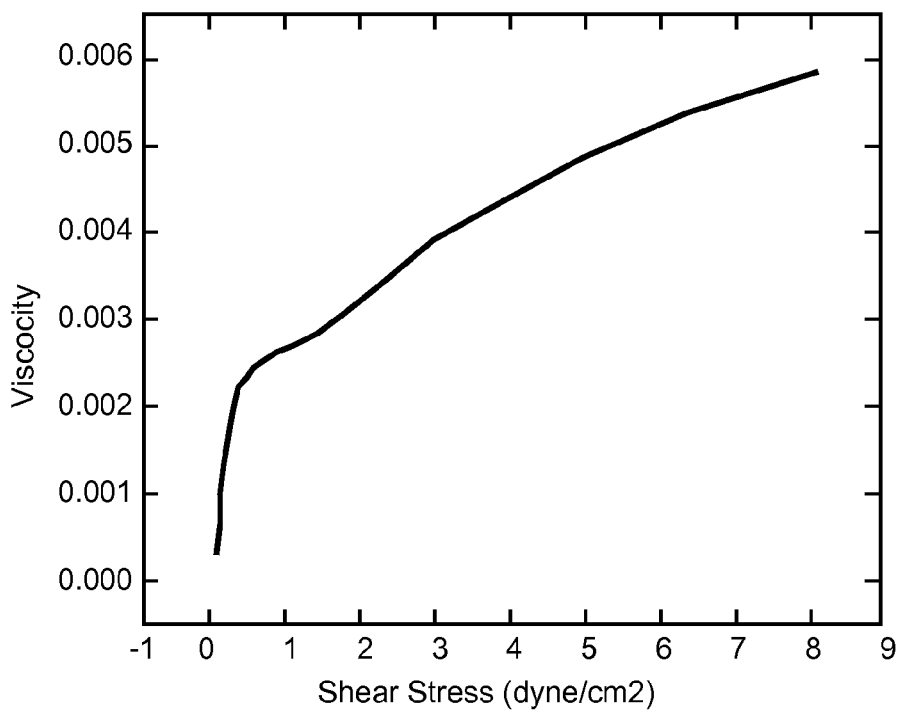
FIG. 21 is a graph showing a rheological profile of 10 wt % silica (Alfa Aesar 400 mesh) in 3:7 EC/DMC containing 1.2 M $LiPF_6$.

A 10 wt. % mixture of diatomaceous silica (Alfa Aesar 400 mesh) in a solution of 3:7 EC/DMC containing 1.2 M LiPF$_6$ was prepared and tested. A rheological profile of the mixture is shown in FIG. 21.

Polydispersity and rheology data from the above examples is summarized below in Table 1.

TABLE 1

| Material | Sonication | Dispersant | Polydispersity | Rheology |
|---|---|---|---|---|
| Fumed silica (Aldrich 5505) | Yes | No | 0.156 | Shear Thin |
| Fumed silica (Degussa R972) | Yes | No | 0.160 | Shear Thin |
| Fumed Silica (Degussa A300) | No | No | 0.495 | Shear Thin |
| Stöber batch 16 | Yes | No | 0.243 | Shear Thin |
| Stöber Batch 20 | No | No | 0.187 | Shear Thin |
| Stöber batch 6 | No | No | 0.087 | Shear Thicken |
| Stöber batch 7 | No | No | 0.005 | Shear Thicken |
| Stöber batch 8 | No | PEI 10K MW | 0.005 | Shear Thicken |
| Stöber batch 21 | No | No | 0.005 | Shear Thicken |
| Diatomaceous silica (Alfa Aesar 400 mesh) | No | No | 0.005 | Shear Thicken |

Example 23

Figure 22:
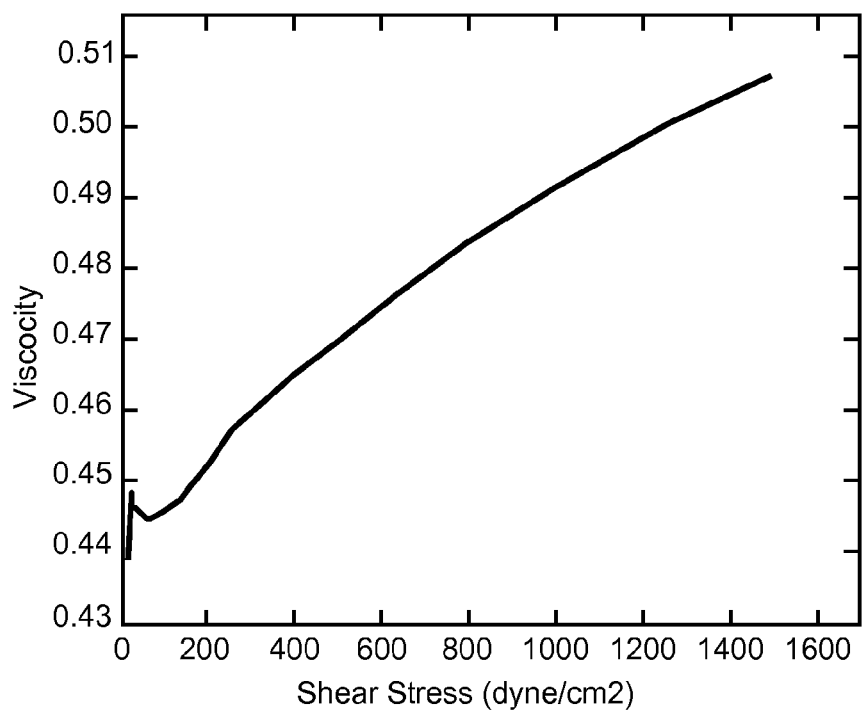
FIG. 22 is a graph showing a rheological profile of 10 wt % Stöber silica batch 7 in 3:7 EC/DMC containing no $LiPF_6$.

A 10 wt. % mixture of Stöber silica batch 7 in a solution of 3:7 EC/DMC containing no LiPF$_6$ was prepared and tested. A rheological profile of the mixture is shown in FIG. 22.

Example 24

Figure 23:
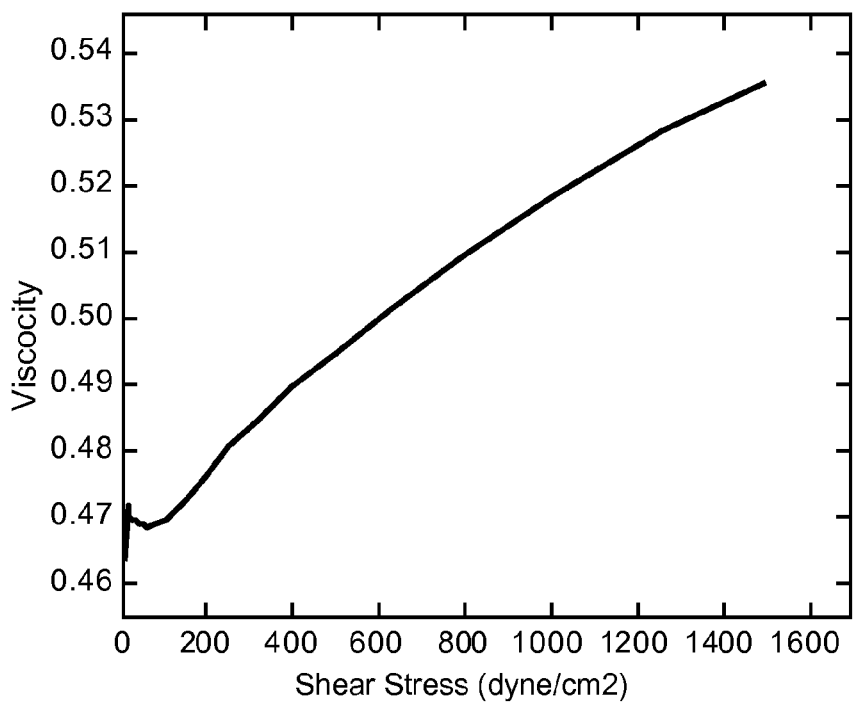
FIG. 23 is a graph showing a rheological profile of 10 wt % Stöber silica batch 7 in 3:7 EC/DMC containing 0.25 M $LiPF_6$.

A 10 wt. % mixture of Stöber silica batch 7 in a solution of 3:7 EC/DMC containing 0.25 M LiPF$_6$ was prepared and tested. A rheological profile of the mixture is shown in FIG. 23.

Example 25

Figure 24:
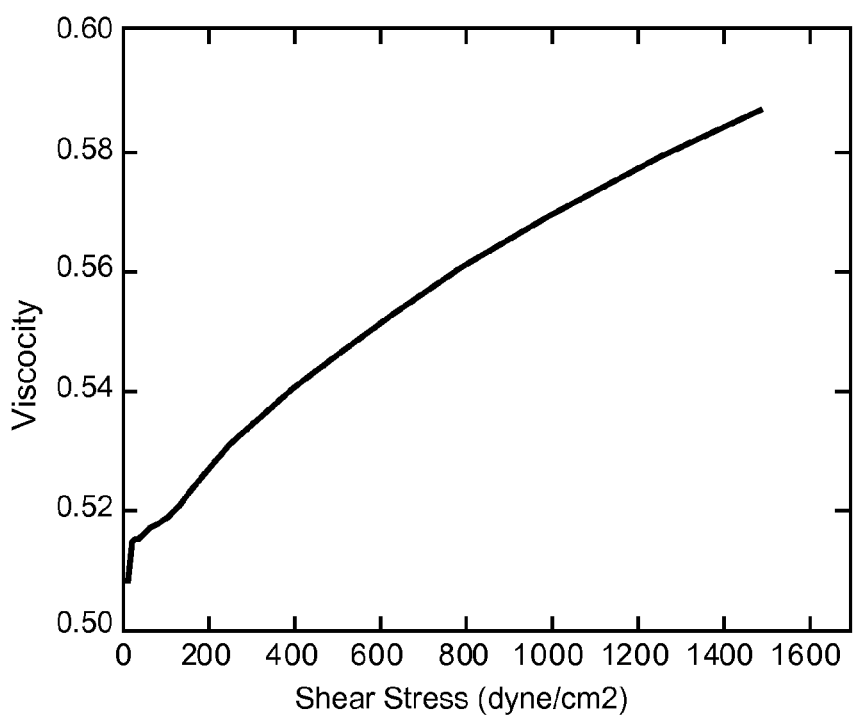
FIG. 24 is a graph showing a rheological profile of 10 wt % Stöber silica batch 7 in 3:7 EC/DMC containing 0.5 M $LiPF_6$.

A 10 wt. % mixture of Stöber silica batch 7 in a solution of 3:7 EC/DMC containing 0.5 M LiPF$_6$ was prepared and tested. A rheological profile of the mixture is shown in FIG. 24.

Example 26

Figure 25:
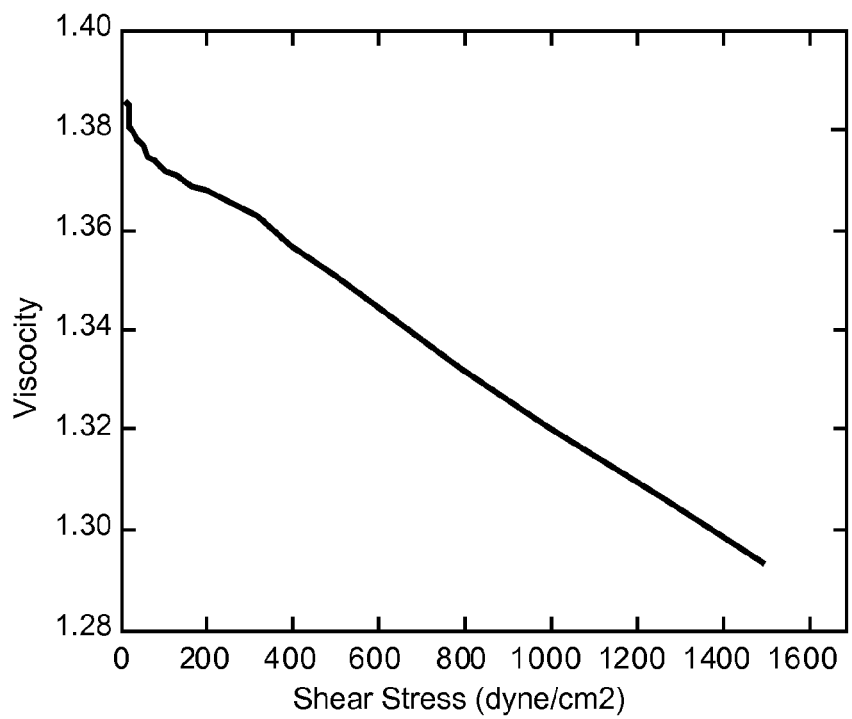
FIG. 25 is a graph showing a rheological profile of 10 wt % Stöber silica batch 8 in 3:7 EC/DMC containing 0 M LiPF$_6$.

A 10 wt. % mixture of Stöber silica batch 8 in a solution of 3:7 EC/DMC containing no LiPF$_6$ was prepared and tested. A rheological profile of the mixture is shown in FIG. 25.

Example 27

Figure 26:
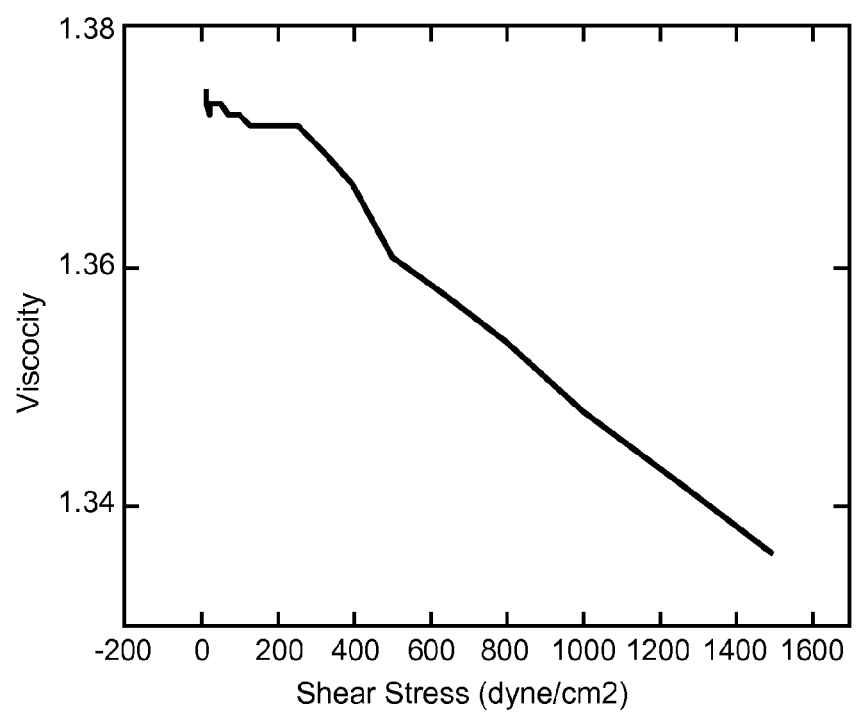
FIG. 26 is a graph showing a rheological profile of 10 wt % Stöber silica batch 8 in 3:7 EC/DMC containing 0.25 M LiPF$_6$.

A 10 wt. % mixture of Stöber silica batch 8 in a solution of 3:7 EC/DMC containing 0.25 M LiPF$_6$ was prepared and tested. A rheological profile of the mixture is shown in FIG. 26.

Example 28

Figure 27:
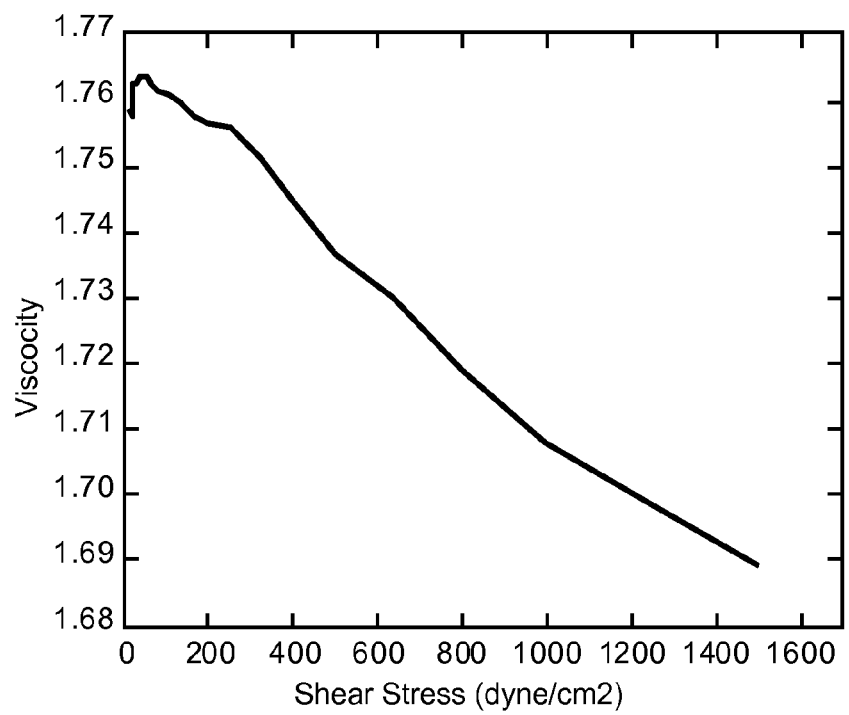
FIG. 27 is a graph showing a rheological profile of 10 wt % Stöber silica batch 8 in 3:7 EC/DMC containing 0.5 M LiPF$_6$.

A 10 wt. % mixture of Stöber silica batch 8 in a solution of 3:7 EC/DMC containing 0.5 M LiPF$_6$ was prepared and tested. A rheological profile of the mixture is shown in FIG. 27.

Figure 28:
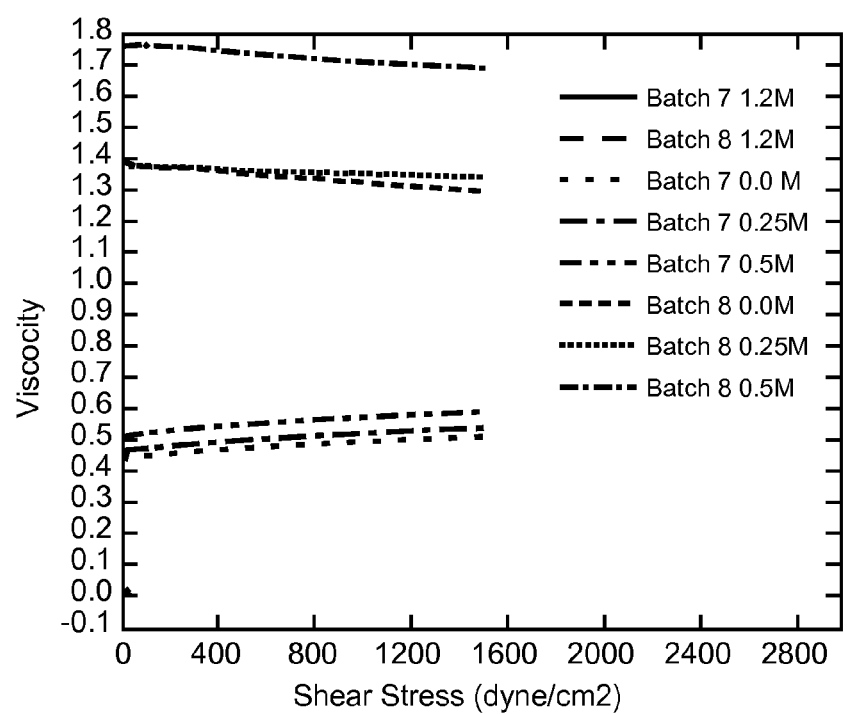
FIG. 28 is a graph showing composite viscosity data as a function of salt concentration

Experimental data summarized in FIG. 28 show that the viscosities of the electrolytes increase with increasing salt concentration, thus providing an opportunity to tune the initial viscosity of the electrolyte, which may aid in the battery manufacturing process.

Example 29

Figure 29:
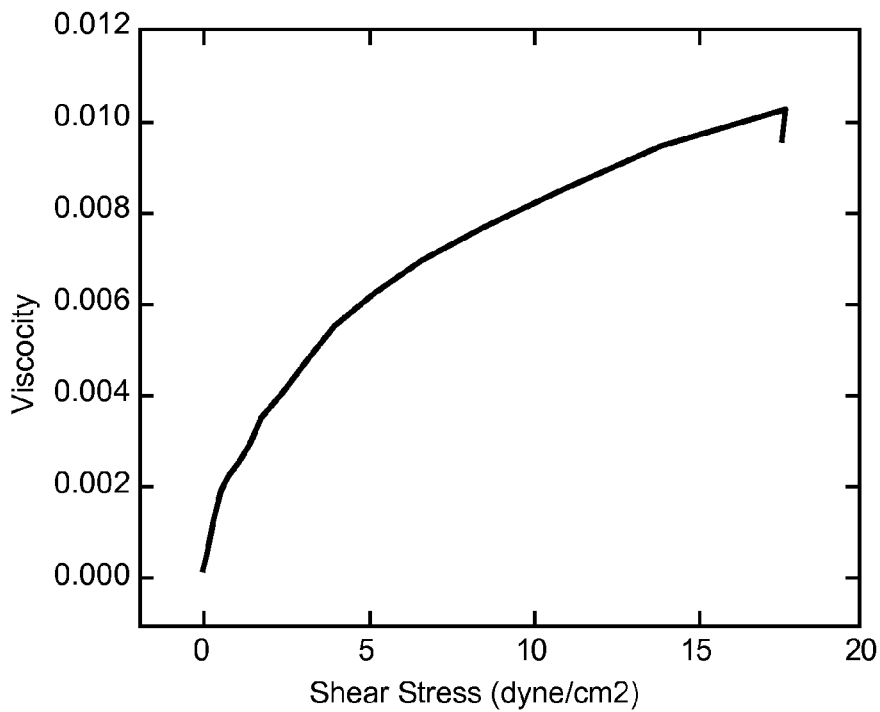
FIG. 29 is a graph showing a rheological profile of 20 wt % Stöber silica batch 8 in 3:7 EC/DMC containing 1.2 M LiPF$_6$.

A 20 wt. % mixture of Stöber silica batch 8 in a solution of 3:7 EC/DMC containing 1.2 M LiPF$_6$ was prepared and tested. A rheological profile of the mixture is shown in FIG. 29.

Example 30

Figure 30:
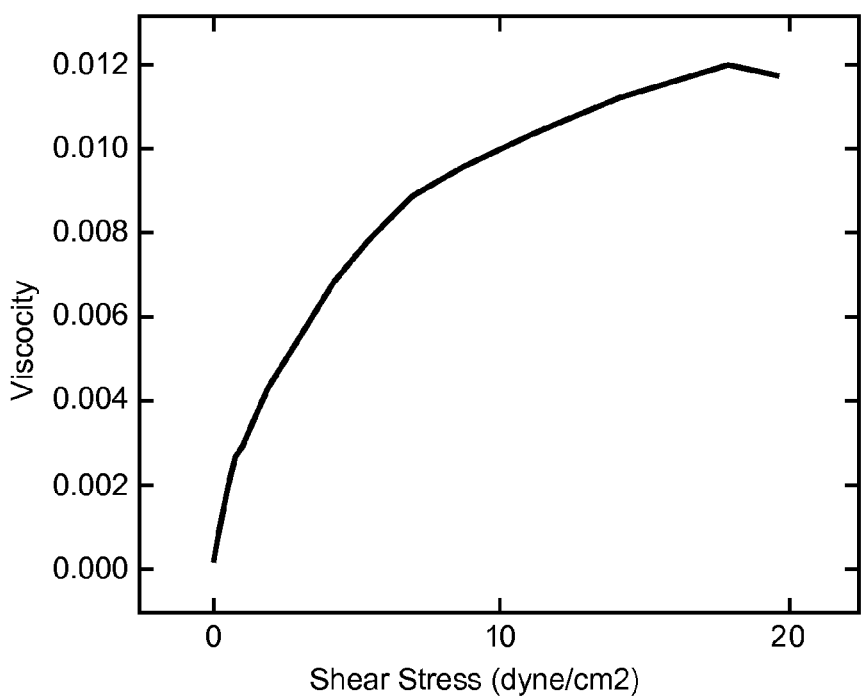
FIG. 30 is a graph showing a rheological profile of 30 wt % Stöber silica batch 8 in 3:7 EC/DMC containing 1.2 M LiPF$_6$.

A 30 wt. % mixture of Stöber silica batch 8 in a solution of 3:7 EC/DMC containing 1.2 M LiPF$_6$ was prepared and tested. A rheological profile of the mixture is shown in FIG. 30.

Example 31

Figure 31:
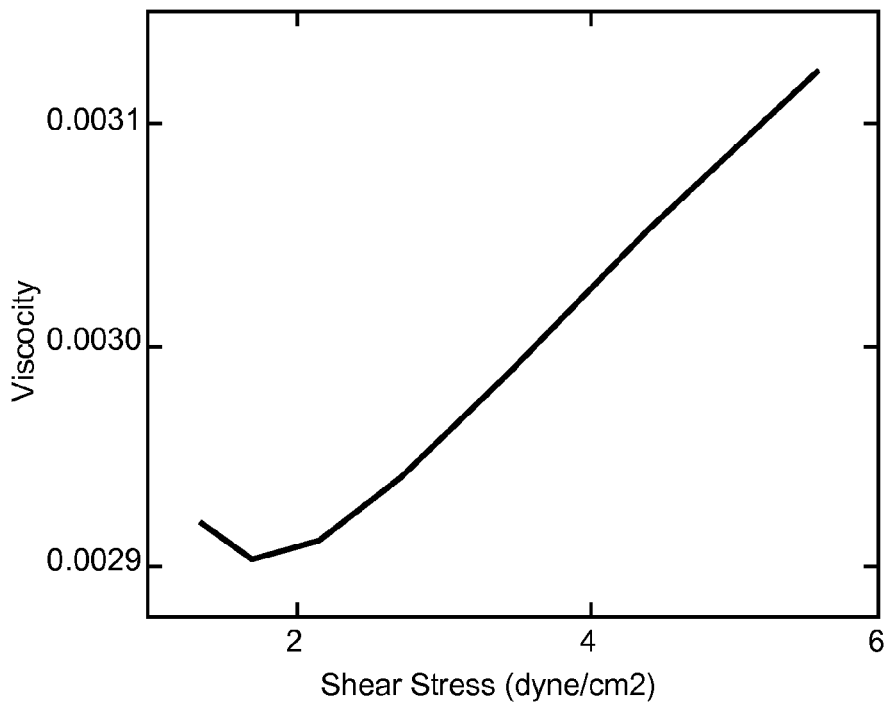
FIG. 31 is a graph showing a rheological profile of 40 wt % Stöber silica batch 8 in 3:7 EC/DMC containing 1.2 M LiPF$_6$.

A 40 wt. % mixture of Stöber silica batch 8 in a solution of 3:7 EC/DMC containing 1.2 M LiPF$_6$ was prepared and tested. A rheological profile of the mixture is shown in FIG. 31.

Figure 32:
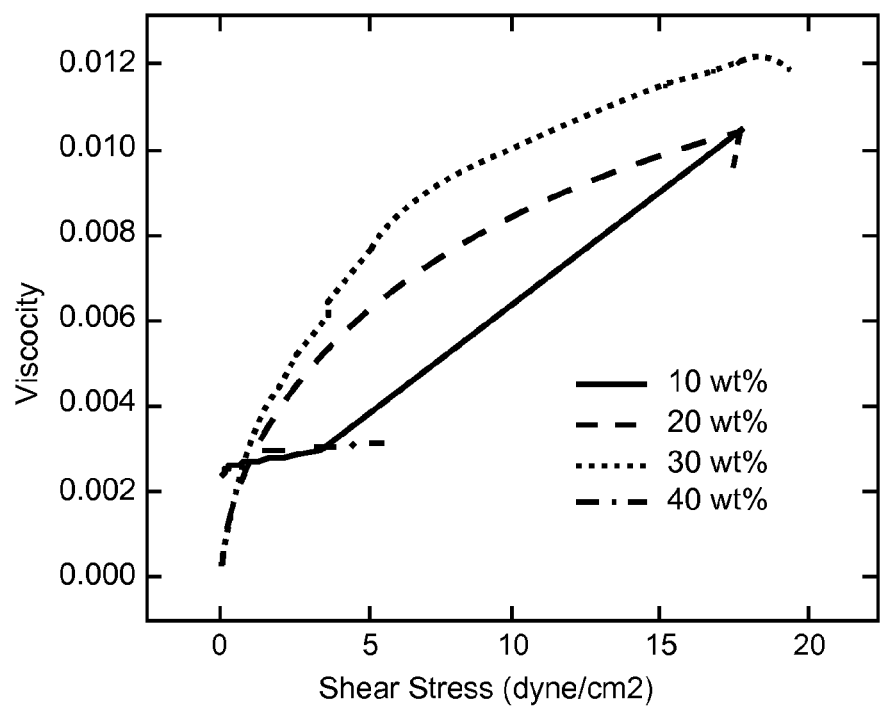
FIG. 32 is a graph showing a rheological profiles of various wt % Stöber silica batch 8 in 3:7 EC/DMC containing 1.2 M LiPF$_6$.

Experimental data summarized in FIG. 32 show that shear thickening response is maximized at a SiO$_2$ weight loading in the range of about 20 to about 40 wt %.

Examples 1-29 detail experimental results demonstrating the properties of the SiO$_2$ materials and how they relate to viscosity of the electrolyte. Polydispersity data indicate how uniform the particles are; a smaller number indicates more monodispersed particles. Zeta potential data indicate the surface charge of the particles. Samples that have a very large dispersity, i.e. less uniform, or low zeta potential do not shear thicken, as demonstrated in Examples 1-12 which show the shear thinning behavior typical of samples containing poly-dispersed SiO$_2$ particles. Examples 13-29 show shear thickening behavior in samples containing more uniform particles or higher zeta potentials.

The addition of silica particles to the liquid electrolyte displaces a significant fraction of Li-salt/Li-ion carriers from solution. It is important to determine the ionic conductivity when formulating an electrolyte. The base level ionic conductivity of the passively impact resistant electrolyte should be at least 0.001 S/cm. It is contemplated that the silica particles can be functionalized with a polymer such as, for example, PEI and/or polyethylene oxide (PEO), to prevent flocculation and/or to improve conductivity.

Example 32

Ionic conductivities were experimentally determined for samples of 3:7 EC/DMC containing varying concentrations of LiPF$_6$, and also for mixtures of various concentrations of Stöber silica batches in a solution of 3:7 EC/DMC containing 1.2 M LiPF$_6$. Data are presented in Table 2.

TABLE 2

| Sample | Ionic conductivity S/cm |
|---|---|
| 0.33M LiPF$_6$ EC/DMC | 0.0071 |
| 0.66M LiPF$_6$ EC/DMC | 0.011 |
| 1.2M LiPF$_6$ EC/DMC | 0.012 |
| 10% Stöber SiO$_2$ Batch 7 in 1.2M LiPF$_6$ EC/DMC | 0.0035 |
| 20% Stöber SiO$_2$ Batch 7 in 1.2M LiPF$_6$ EC/DMC | 0.0034 |
| 30% Stöber SiO$_2$ Batch 7 in 1.2M LiPF$_6$ EC/DMC | 0.0035 |
| 13% Stöber SiO$_2$ Batch 21 in 1.2M LiPF$_6$ EC/DMC | 0.0037 |

Example 33

Figure 33:
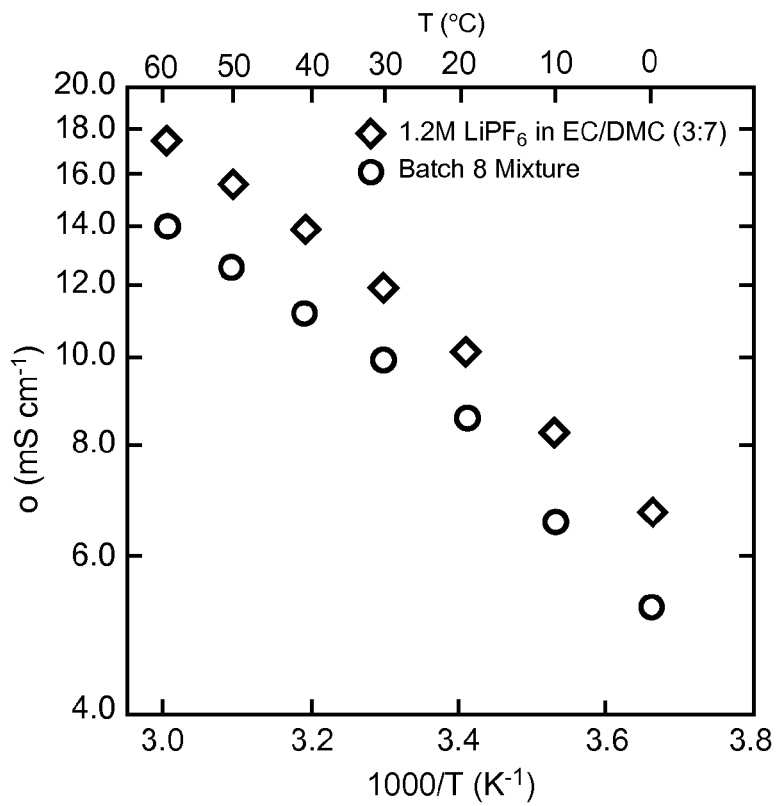
FIG. 33 is a graph showing ionic conductivity as a function of temperature for 20 wt % Stöber silica batch 8 in 3:7 EC/DMC containing 1.2 M LiPF$_6$, and 3:7 EC/DMC containing 1.2 M LiPF$_6$ with no silica added.

Comparative ionic conductivity was measured as a function of temperature for a 20 wt. % mixture of Stöber silica batch 8 in a solution of 3:7 EC/DMC containing 1.2 M LiPF$_6$ and 3:7 EC/DMC containing 1.2 M LiPF$_6$ with no silica added. Results are shown in FIG. 33.

The ultimate goal of these materials is for the use as an electrolyte in a rechargeable battery. Therefore, electrochemical studies were performed to characterize the discharging and recharging cycle (hereinafter called cycle) performance of various electrolytes that performed well in the examples hereinabove.

Example 34

Figure 34:
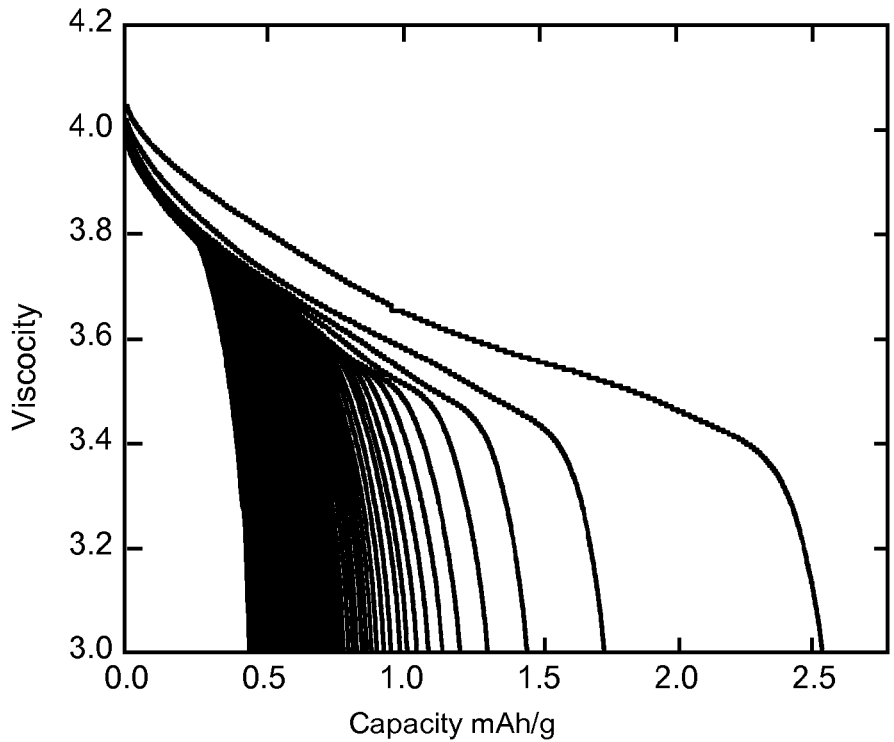
FIG. 34 is a graph showing electrochemical data recorded for a LiNi$_{1/3}$Mn$_{1/3}$Co$_{1/3}$O$_2$:graphite (NMC:Gr) cell using a 21 wt % Silica Stöber derived silica batch 8 dried under vacuum at ambient temperature in 3:7 EC/DMC containing 1.2 M LiPF$_6$.

Stöber derived silica batch 8 was dried under vacuum at ambient temperature and used to make an electrolyte comprising 21 wt % silica in 3:7 EC/DMC containing 1.2 M LiPF$_6$. The electrolyte was placed between separators and loaded into a standard prismatic NMC:Gr electrochemical cell for testing. Electrochemical data from multiple cycles, shown in FIG. 34, indicates poor cycling characteristics.

Example 35

Figure 35:
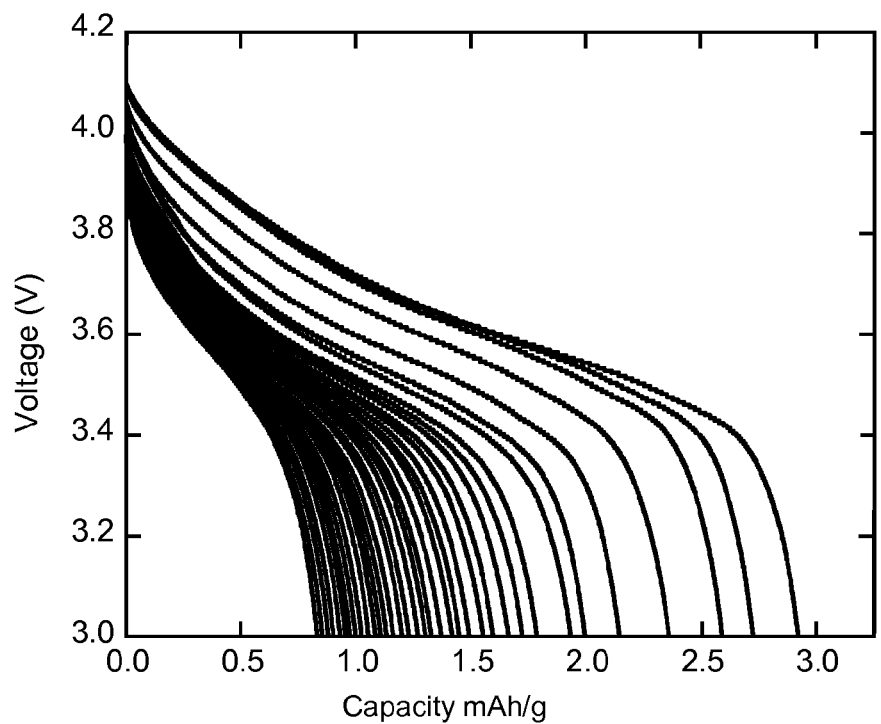
FIG. 35 is a graph showing electrochemical data recorded for a NMC:Gr cell using a 19 wt % Silica Stöber derived silica batch 8 dried under vacuum at ambient temperature in 3:7 EC/DMC containing 1.2 M LiPF$_6$.

Stöber derived silica batch 8 was dried under vacuum at ambient temperature and used to make an electrolyte comprising 19 wt % silica in 3:7 EC/DMC containing 1.2 M LiPF$_6$. The electrolyte was placed between separators and loaded into a standard prismatic NMC:Gr electrochemical cell for testing. Electrochemical data from multiple cycles, shown in FIG. 35, indicates poor cycling characteristics.

Example 36

Figure 36:
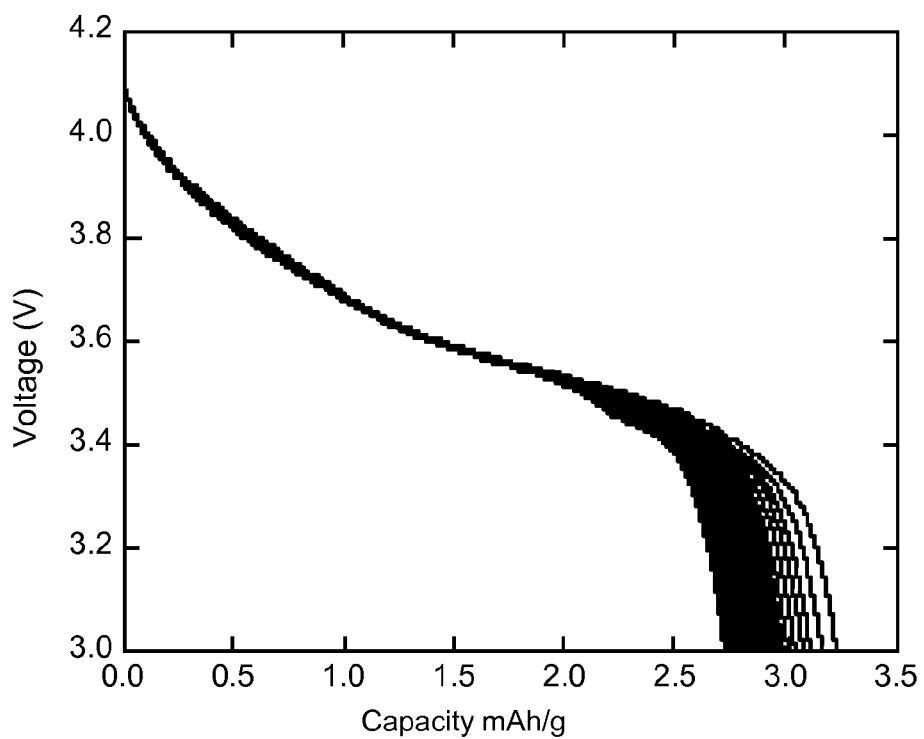
FIG. 36 is a graph showing electrochemical data recorded for a NMC:Gr cell using a 24 wt % Silica Stöber derived silica batch 8 dried under vacuum at 80° C. in 3:7 EC/DMC containing 1.2 M LiPF$_6$.

Stöber derived silica batch 8 was dried under vacuum at 80° C. and used to make an electrolyte comprising 24 wt % silica in 3:7 EC/DMC containing 1.2 M LiPF$_6$. The electrolyte was placed between separators and loaded into a standard prismatic NMC:Gr electrochemical cell for testing. Electrochemical data from cycles, shown in FIG. 36, indicates marginal cycling characteristics, but an improvement over silica dried only under vacuum.

Example 37

Figure 37:
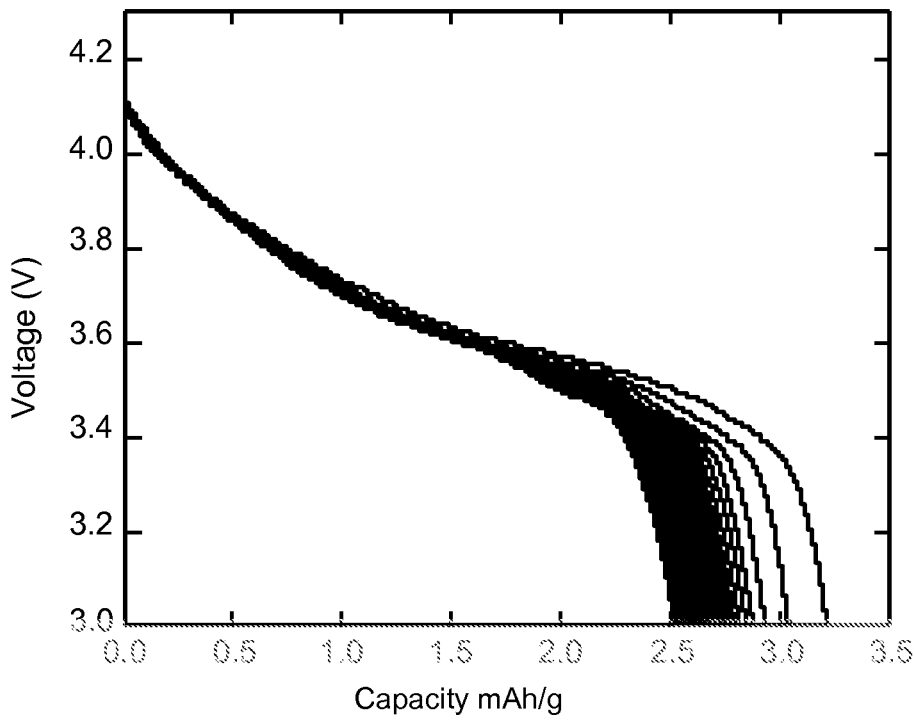
FIG. 37 is a graph showing electrochemical data recorded for a NMC:Gr cell using a 21 wt % Silica Stöber derived silica batch 8 dried under vacuum at 90° C. in 3:7 EC/DMC containing 1.2 M LiPF$_6$.

Stöber derived silica batch 8 was dried under vacuum at 90° C. and used to make an electrolyte comprising 21 wt % silica in 3:7 EC/DMC containing 1.2 M LiPF$_6$. The electrolyte was placed between separators and loaded into a standard prismatic NMC:Gr electrochemical cell for testing. Electrochemical data from multiple cycles, shown in FIG. 37, indicates marginal cycling characteristics, but an improvement over silica dried at 80° C.

Example 38

Figure 38:
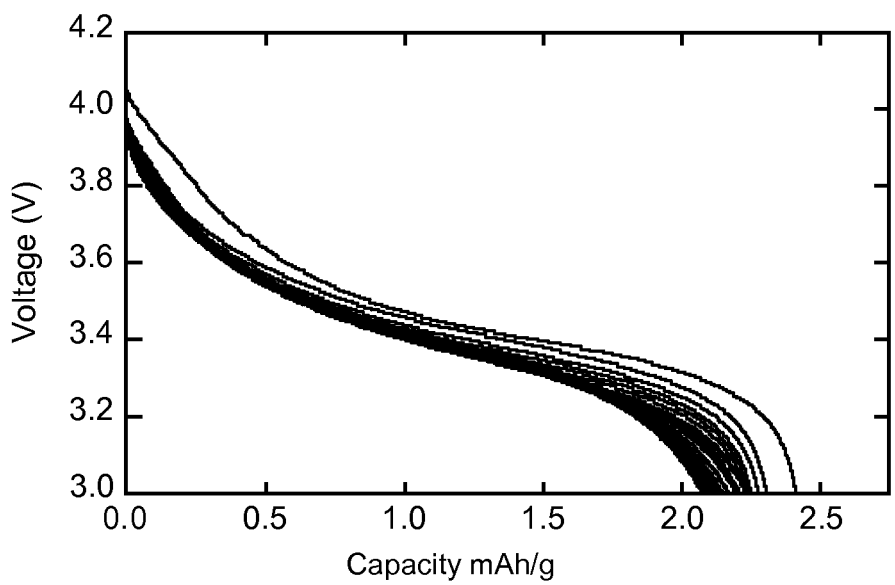
FIG. 38 is a graph showing electrochemical data recorded for a NMC:Gr cell using a 24 wt % Silica Stöber derived silica batch 8 dried under vacuum at 90° C. in 3:7 EC/DMC containing 1.2 M LiPF$_6$.

Stöber derived silica batch 8 was dried under vacuum at 90° C. and used to make an electrolyte comprising 21 wt % silica in 3:7 EC/DMC containing 1.2 M LiPF$_6$. The electrolyte was placed between separators and loaded into a standard prismatic NMC:Gr electrochemical cell for testing. Electrochemical data from multiple cycles, shown in FIG. 38, indicates marginal cycling characteristics, but an improvement over silica dried at 80° C.

Example 39

Figure 39:
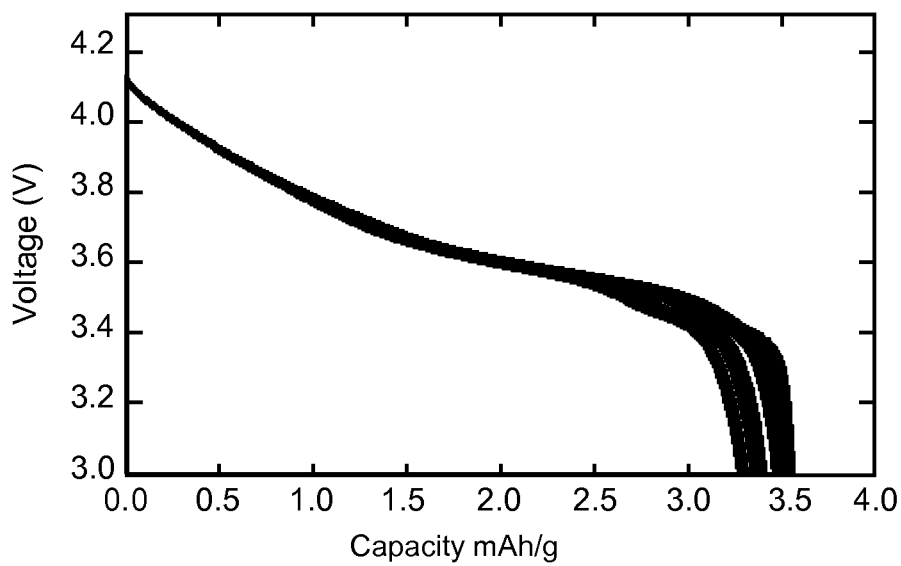
FIG. 39 is a graph showing electrochemical data recorded for a NMC:Gr cell using a 21 wt % Silica Stöber derived silica batch 8 dried under vacuum at 100° C. in 3:7 EC/DMC containing 1.2 M LiPF$_6$.

Stöber derived silica batch 8 was dried under vacuum at 100° C. and used to make an electrolyte comprising 21 wt % silica in 3:7 EC/DMC containing 1.2 M LiPF$_6$. The electrolyte was placed between separators and loaded into a standard prismatic NMC:Gr electrochemical cell for testing. Electrochemical data from multiple cycles, shown in FIG. 39, indicates improved cycling characteristics over silica dried at 90° C.

Example 40

Figure 40:
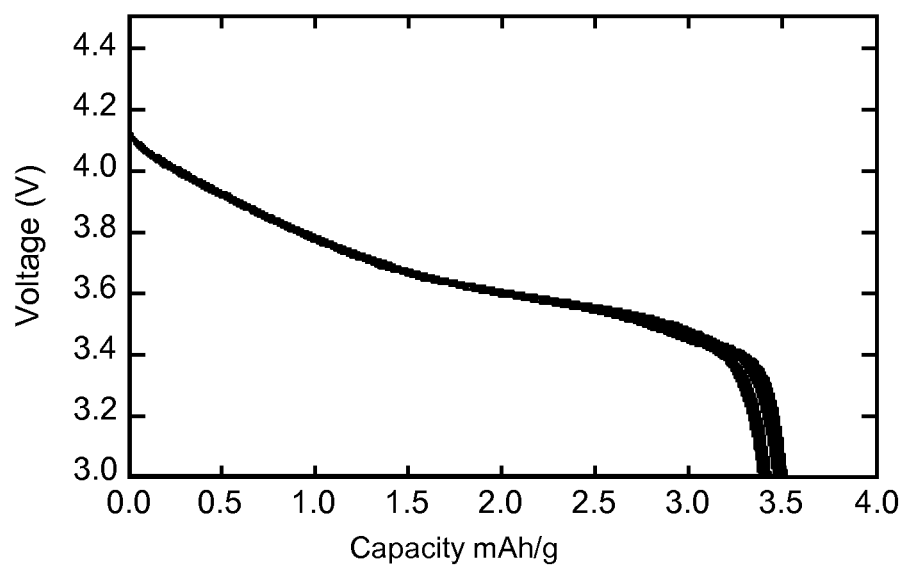
FIG. 40 is a graph showing electrochemical data recorded for a NMC:Gr cell using a 21 wt % Silica Stöber derived silica batch 8 dried under vacuum at 100° C. in 3:7 EC/DMC containing 1.2 M LiPF$_6$.

Stöber derived silica batch 8 was dried under vacuum at 100° C. and used to make an electrolyte comprising 21 wt % silica in 3:7 EC/DMC containing 1.2 M LiPF$_6$. The electrolyte was placed between separators and loaded into a standard prismatic NMC:Gr electrochemical cell for testing. Electrochemical data from multiple cycles, shown in FIG. 40, indicates improved cycling characteristics over silica dried at 90° C.

Example 41

Figure 41:
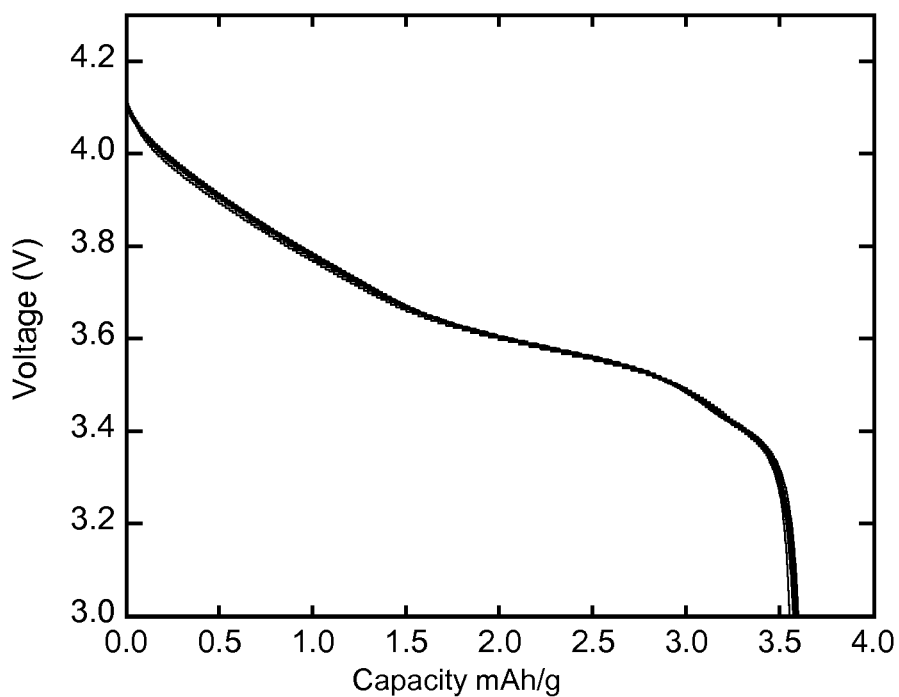
FIG. 41 is a graph showing electrochemical data recorded for a NMC:Gr cell using a 22 wt % Silica Stöber derived silica batch 8 dried under vacuum at 120° C. in 3:7 EC/DMC containing 1.2 M LiPF$_6$.

Stöber derived silica batch 8 was dried under vacuum at 120° C. and used to make an electrolyte comprising 22 wt % silica in 3:7 EC/DMC containing 1.2 M LiPF$_6$. The electrolyte was placed between separators and loaded into a standard prismatic NMC:Gr electrochemical cell for testing. Electrochemical data from multiple cycles, shown in FIG. 41, indicates improved cycling characteristics over silica dried at 100° C.

Example 42

Figure 42:
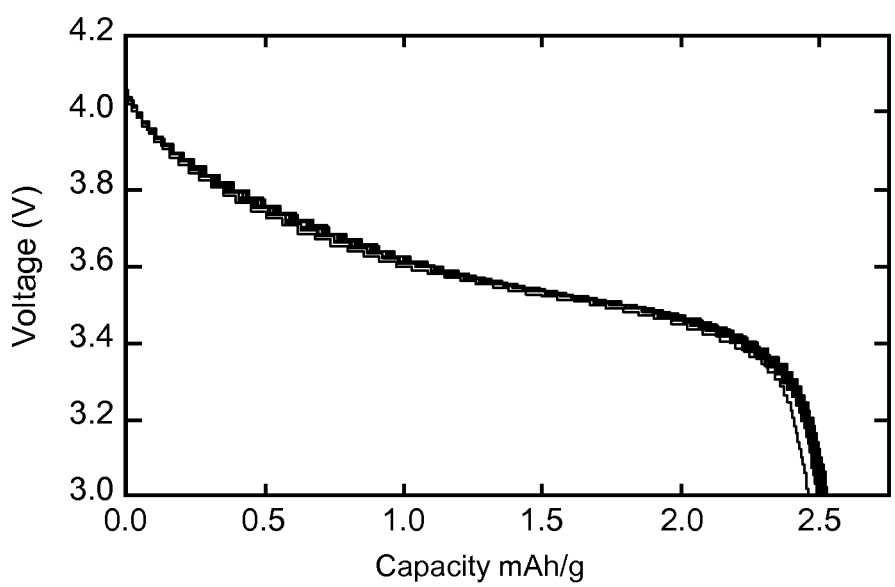
FIG. 42 is a graph showing electrochemical data recorded for a NMC:Gr cell using a 24 wt % Silica Stöber derived silica batch 8 dried under vacuum at 120° C. in 3:7 EC/DMC containing 1.2 M LiPF$_6$.

Stöber derived silica batch 8 was dried under vacuum at 120° C. and used to make an electrolyte comprising 24 wt % silica in 3:7 EC/DMC containing 1.2 M LiPF$_6$. The electrolyte was placed between separators and loaded into a standard prismatic NMC:Gr electrochemical cell for testing. Electrochemical data from multiple cycles, shown in FIG. 42, indicates improved cycling characteristics over silica dried at 100° C.

Electrolyte samples were loaded into electrochemical cells and tested for the ability to resist shorting upon a mechanical impact event.

Example 43

Figure 43:
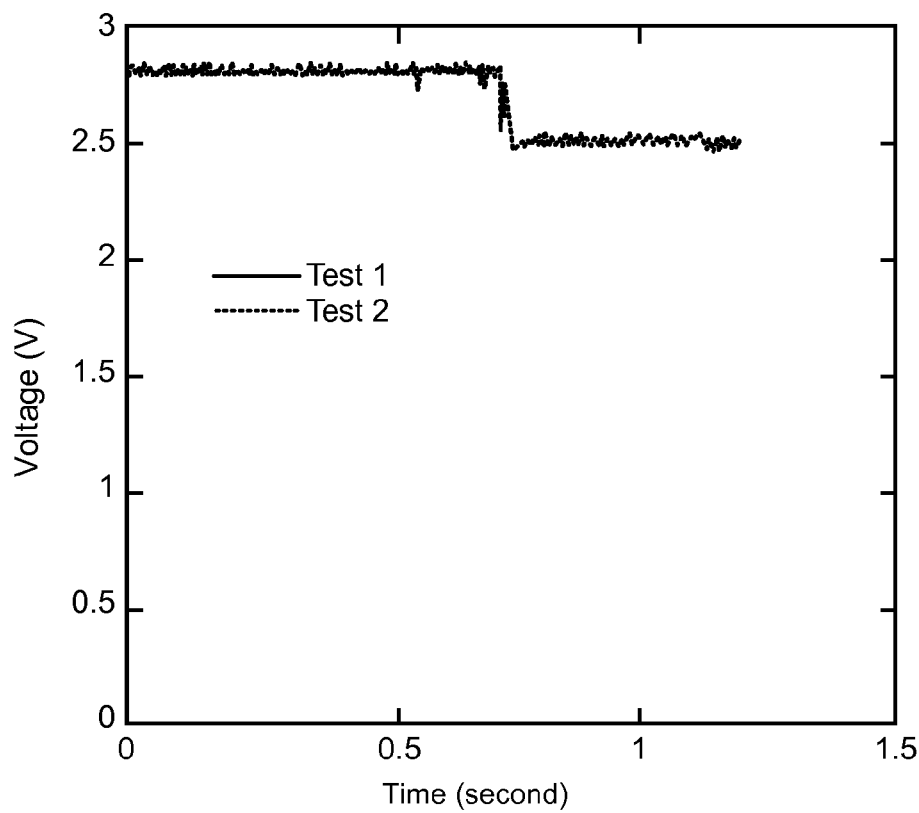
FIG. 43 is a graph showing impact test data recorded for a NMC:Gr cell using a standard, conventional electrolyte 3:7 EC/DMC containing 1.2 M LiPF$_6$.

Two 2" by 2" prismatic pouch cells were constructed using NMC cathodes and graphite anodes. The electrodes were separated using a standard Dreamweaver separator filled with a conventional electrolyte comprising 3:7 EC/DMC containing 1.2 M LiPF$_6$. Each of the cells were subjected to an impact test where a ½" diameter steel ball was placed on the cell. A 3" diameter brass ball was dropped from a height of 18 cm on the steel ball. FIG. 43 shows electrochemical data measured during the two identical tests where there is a decrease in voltage due to an electrical short caused by the electrodes coming into contact. This test shows failure of conventional cell structure.

Example 44

Figure 44:
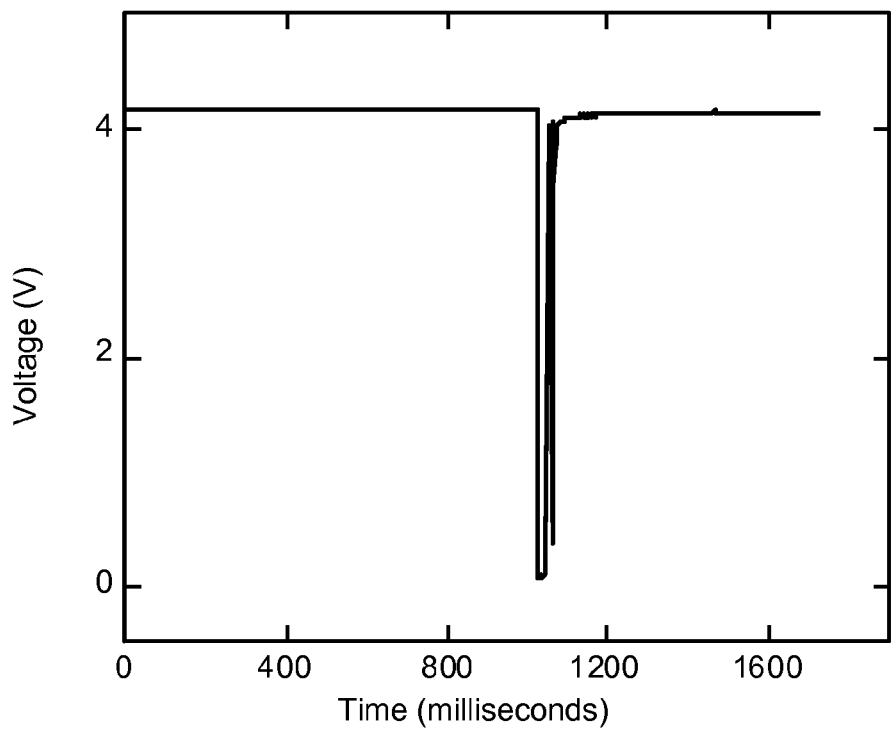
FIG. 44 is a graph showing impact test data recorded for a NMC:Gr cell using 3:7 EC/DMC containing 1.2 M LiPF$_6$.

A 1" by 1" prismatic pouch cell was constructed using a NMC cathode and a graphite anode. The electrodes were separated using a standard Dreamweaver separator filled with a conventional electrolyte comprising 3:7 EC/DMC containing 1.2 M LiPF$_6$. The cell was subjected to an impact test where a ½" diameter steel ball was placed on the cell. A 3" diameter brass ball was dropped from a height of 18 cm on the steel ball. FIG. 44 shows electrochemical data measured during the test where there is a decrease in voltage due to an electrical short caused by the electrodes coming into contact. This test shows failure of conventional cell structure.

Example 45

Figure 45:
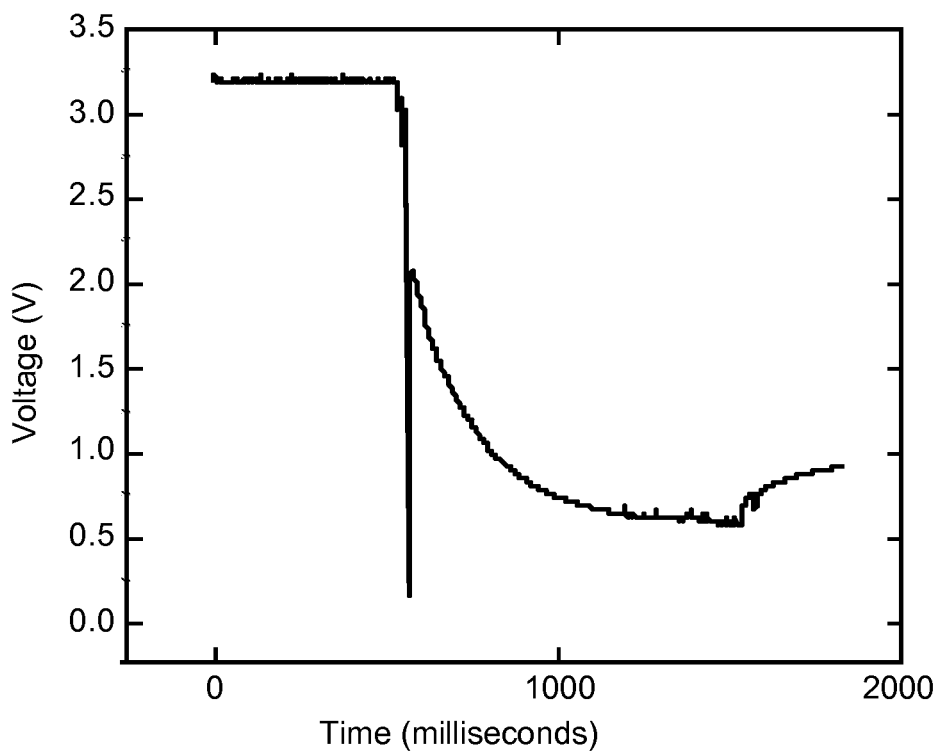
FIG. 45 is a graph showing impact test data recorded for a NMC:Gr cell using 3:7 EC/DMC containing 1.2 M LiPF$_6$.

A 1" by 1" prismatic pouch cell was constructed using a NMC cathode and a graphite anode. The electrodes were separated using a standard polyether ether ketone (PEEK) separator filled with a conventional electrolyte comprising 3:7 EC/DMC containing 1.2 M LiPF$_6$. The cell was subjected to an impact test where a ½" diameter steel ball was placed on the cell. A 3" diameter brass ball was dropped from a height of 18 cm on the steel ball. FIG. 45 shows electrochemical data measured during the test where there is a decrease in voltage due to an electrical short caused by the electrodes coming into contact. This test shows failure of conventional cell structure.

Example 46

Figure 46:
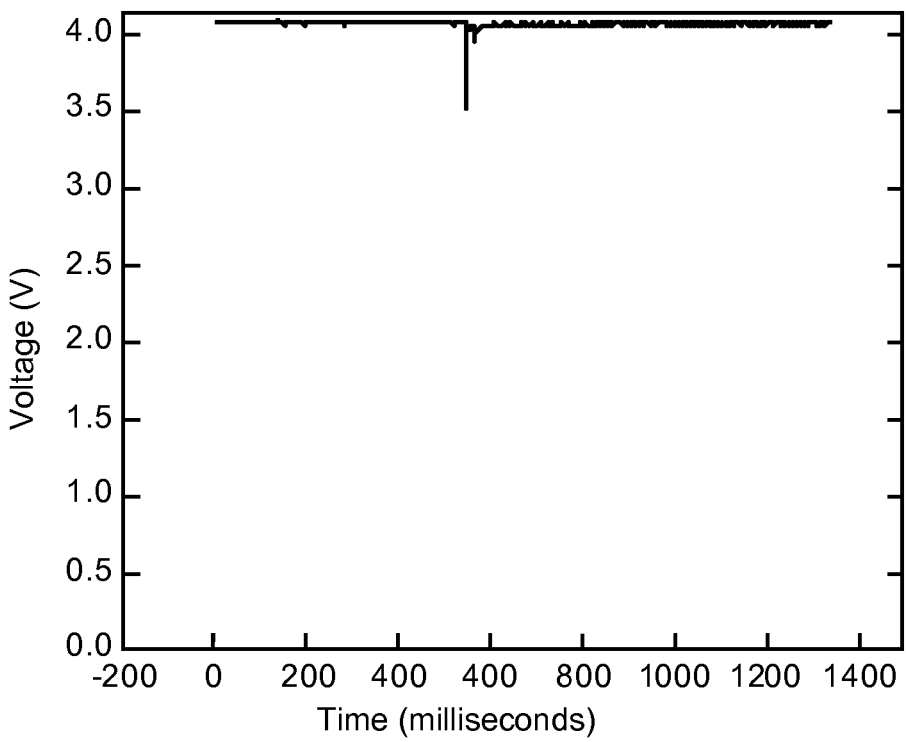
FIG. 46 is a graph showing impact test data recorded for a NMC:Gr cell using 24 wt % Stöber silica dried at 120° C. in 3:7 EC/DMC containing 1.2 M LiPF$_6$.

A 1" by 1" prismatic pouch cell was constructed using a NMC cathode and a graphite anode. The electrodes were separated using a standard polyether ether ketone (PEEK) separator filled with an electrolyte comprising 24 wt % Stöber silica dried at 120° C. in 3:7 EC/DMC containing 1.2 M LiPF$_6$. The cell was subjected to an impact test where a ½" diameter steel ball was placed on the cell. A 3" diameter brass ball was dropped from a height of 18 cm on the steel ball. FIG. 46 shows electrochemical data measured during the test where there is a significantly lower decrease in voltage due to a cell short compared to the conventional electrolyte. This test shows improvement of the cell structure having the impact resistant electrolyte.

Example 47

Figure 47:
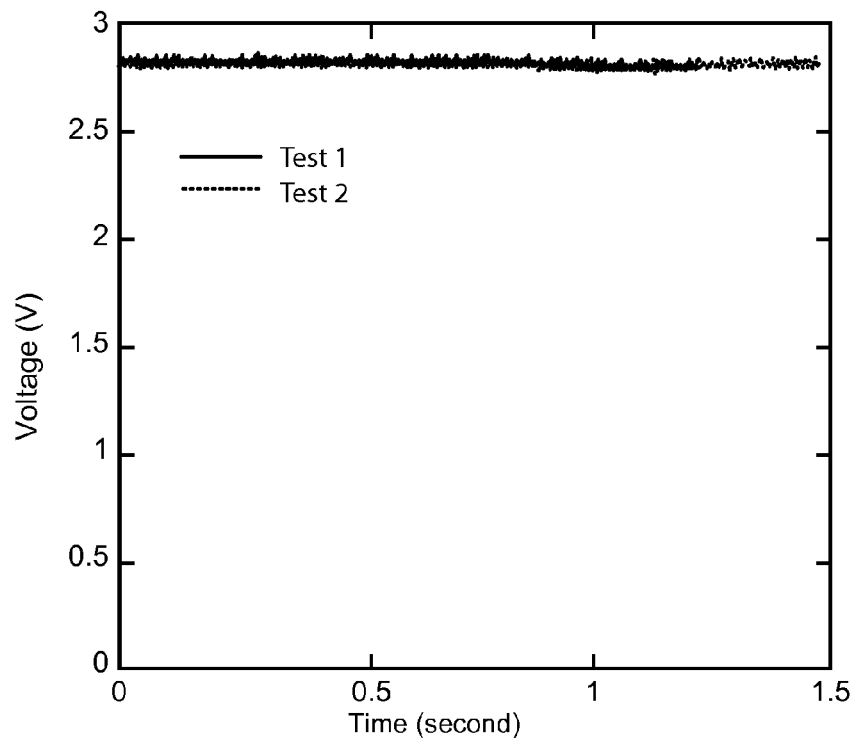
FIG. 47 is a graph showing impact test data recorded for a NMC:Gr cell using 24 wt % Stöber silica dried at 120° C. in 3:7 EC/DMC containing 1.2 M LiPF$_6$.
Figure 48:
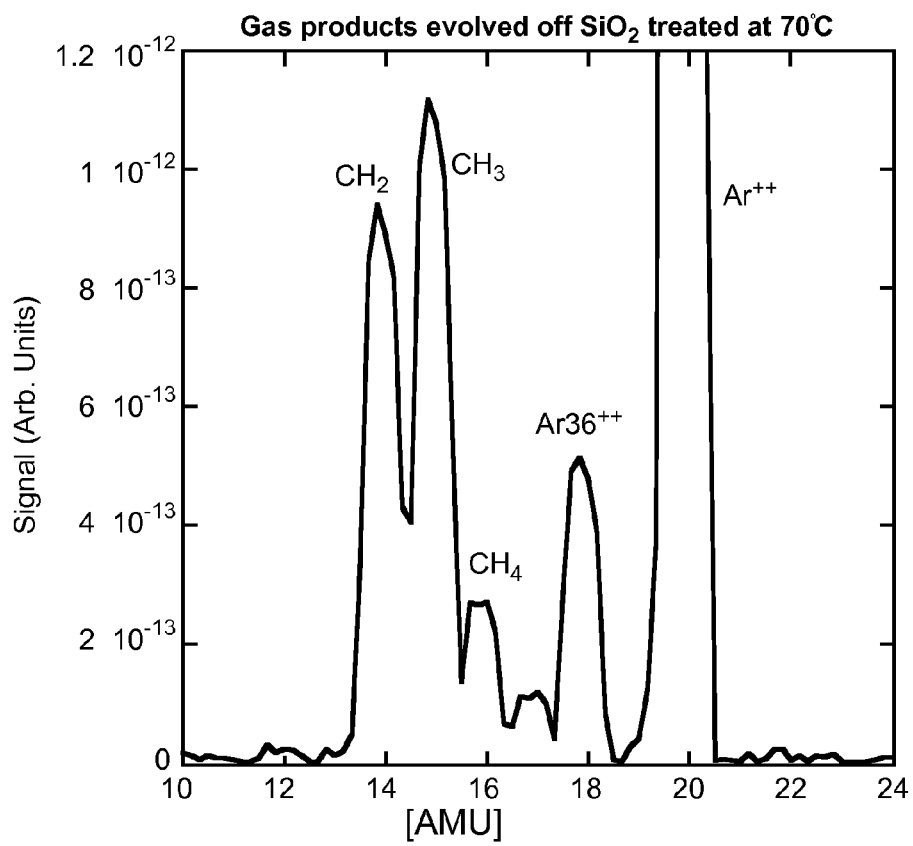
FIG. 48 is a graph showing mass spectrometer data (10-24 AMU) collected for the gas evolved from the chemical reaction of fumed silica (5505-Aldrich) dried at 70° C. in 3:7 EC/DMC containing 1.2 M LiPF$_6$.
Figure 49:
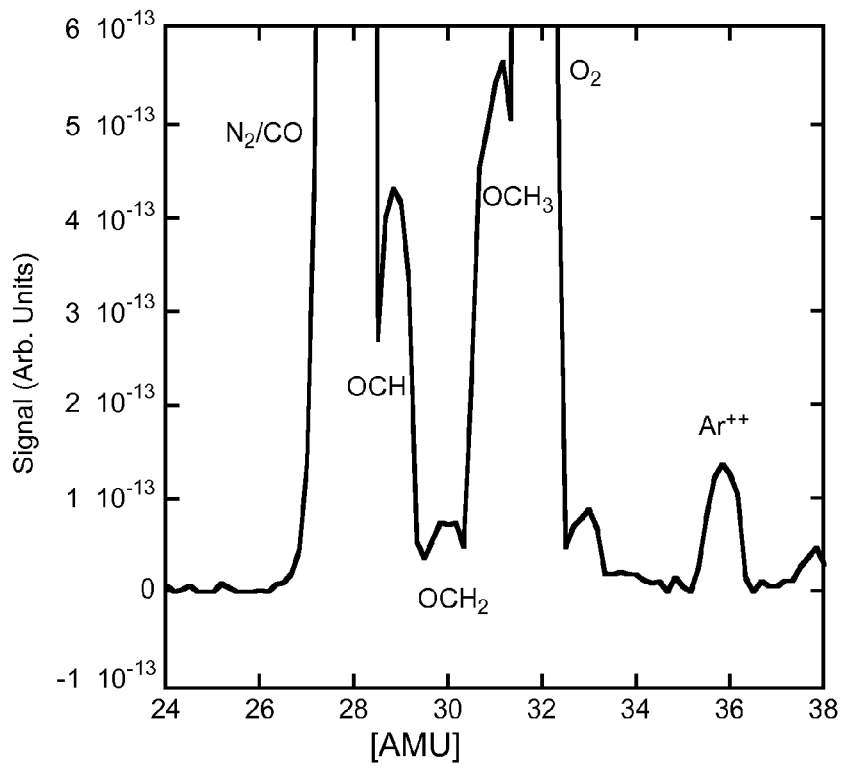
FIG. 49 is a graph showing mass spectrometer data (24-38 AMU) collected for the gas evolved from the chemical reaction of fumed silica (5505-Aldrich) dried at 70° C. in 3:7 EC/DMC containing 1.2 M LiPF$_6$.
Figure 50:
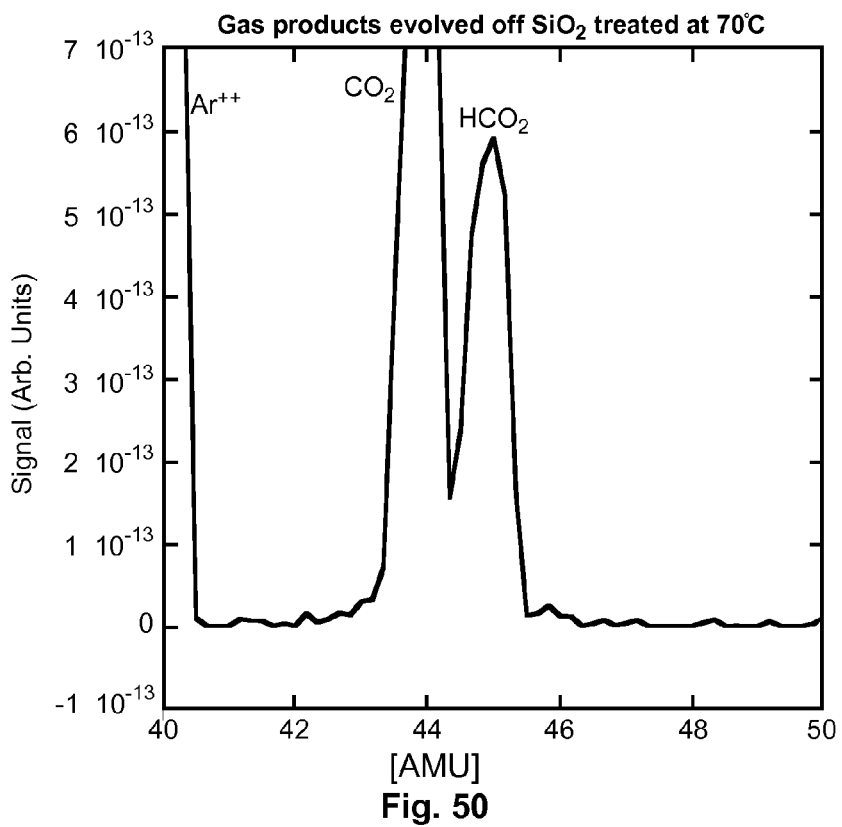
FIG. 50 is a graph showing mass spectrometer data (40-50 AMU) collected for the gas evolved from the chemical reaction of fumed silica (5505-Aldrich) dried at 70° C. in 3:7 EC/DMC containing 1.2 M LiPF$_6$.
Figure 51:
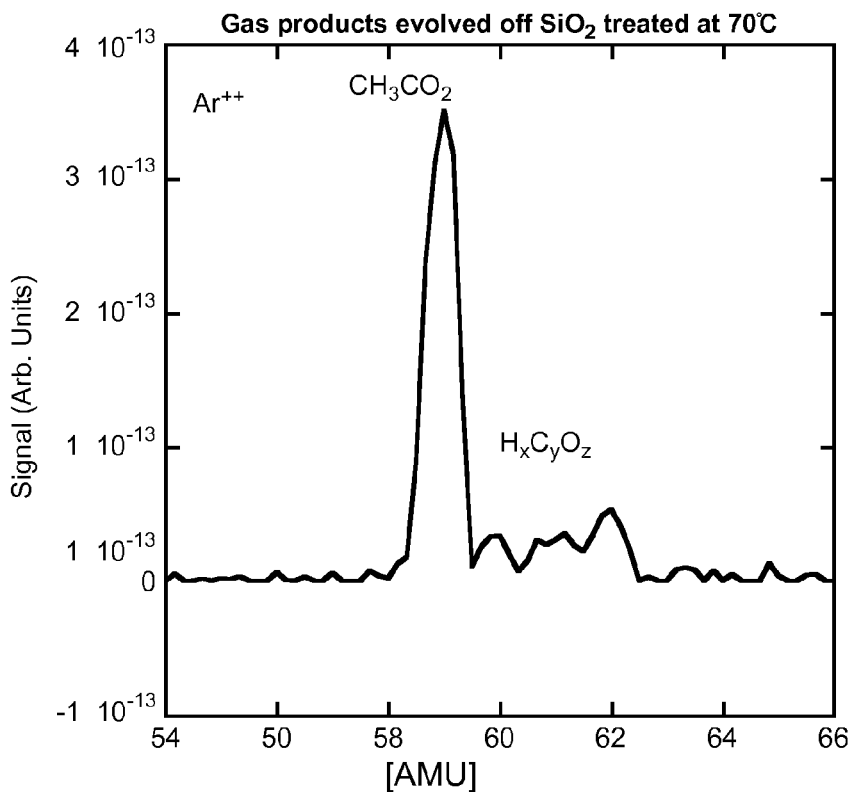
FIG. 51 is a graph showing mass spectrometer data (54-66 AMU) collected for the gas evolved from the chemical reaction of fumed silica (5505-Aldrich) dried at 70° C. in 3:7 EC/DMC containing 1.2 M LiPF$_6$.
Figure 52:
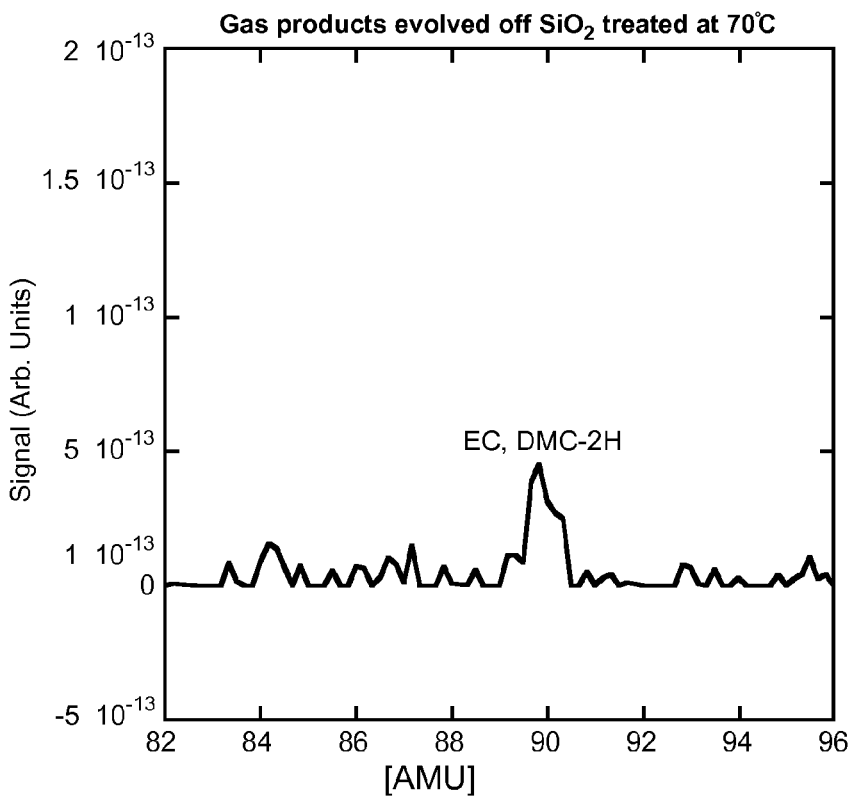
FIG. 52 is a graph showing mass spectrometer data (82-96 AMU) collected for the gas evolved from the chemical reaction of fumed silica (5505-Aldrich) dried at 70° C. in 3:7 EC/DMC containing 1.2 M LiPF$_6$.

Two 2" by 2" prismatic pouch cells were constructed using NMC cathodes and graphite anodes. The electrodes were separated using a standard Dreamweaver separator filled with a conventional electrolyte comprising 24 wt % Stöber silica dried at 120° C. in 3:7 EC/DMC containing 1.2 M LiPF$_6$. Each of the cells were subjected to an impact test where a ½" diameter steel ball was placed on the cell. A 3" diameter brass ball was dropped from a height of 18 cm on the steel ball. FIG. 47 shows electrochemical data measured during the two identical tests there is no decrease in voltage due to a cell short compared to the conventional electrolyte. This test shows complete success of the cell structure having the impact resistant electrolyte.

Examples 34-42 show that cycle performance is directly related to removal of volatile materials associated with the silica particles. Processing temperature is critical for volatilizing such materials. The silica particles should be heat treated, preferably under reduced pressure (vacuum), at a temperature greater than 80° C., preferably at least 90° C., more preferably at least 100° C., still more preferably at least 110° C., most preferably at least 120° C. in order to evaporate and drive off volatile materials. Without heat treatment of the silica particles a substantial volume of gas is evolved in cycling as evident by cell swelling. Silica particles should thus be essentially free of materials that volatilize at a temperature of at least 80° C., preferably at least 90° C., more preferably at least 100° C., still more preferably at least 110° C., most preferably at least 120° C.

Example 48

A sample of silica (Aldrich 5505) was heat treated at 70° C. and materials volatilized therefrom was analyzed by mass spectrometry; data are shown in FIGS. 48-52, which show consecutive regions of mass of evolved gas molecules. Unsuitable drying will produce similar, pernicious gas product evolutions within battery cells.

While there has been shown and described what are at present considered to be examples of the invention, it will be obvious to those skilled in the art that various changes and modifications can be prepared therein without departing from the scope of the inventions defined by the appended claims.

What is claimed is:

1. A passively impact resistant composite electrolyte composition comprising an electrolyte solvent, up to 2M of an electrolyte salt, and shear thickening ceramic particles, said shear thickening ceramic particles having a polydispersity index of no greater than 0.1, an average particle size in a range of 50 nm to 1 μm, and an absolute zeta potential of greater than ±40 mV.

2. A passively impact resistant composite electrolyte composition in accordance with claim 1 wherein said shear thickening ceramic particles comprise at least one material selected from the group consisting of $TiO_2$, $Al_2O_3$, $ZrO_2$, $Y_2O_3$, $HfO_2$, $GeO_2$, $Sc_2O_3$, $CeO_2$, MgO, and $SiO_2$.

3. A passively impact resistant composite electrolyte composition in accordance with claim 2 wherein said shear thickening ceramic particles comprise silica.

4. A passively impact resistant composite electrolyte composition in accordance with claim 1 wherein said shear thickening ceramic particles have a polydispersity index of no greater than 0.09.

5. A passively impact resistant composite electrolyte composition in accordance with claim 4 wherein said shear thickening ceramic particles have a polydispersity index of no greater than 0.07.

6. A passively impact resistant composite electrolyte composition in accordance with claim 5 wherein said shear thickening ceramic particles have a polydispersity index of no greater than 0.05.

7. A passively impact resistant composite electrolyte composition in accordance with claim 1 wherein said shear thickening ceramic particles have an average particle size of in a range of 100 nm to 500 nm.

8. A passively impact resistant composite electrolyte composition in accordance with claim 7 wherein said shear thickening ceramic particles have an average particle size of in a range of 150 nm to 300 nm.

9. A passively impact resistant composite electrolyte composition in accordance with claim 1 wherein said shear thickening ceramic particles have an absolute zeta potential of greater than ±50 mV.

10. A passively impact resistant composite electrolyte composition in accordance with claim 9 wherein said shear thickening ceramic particles have an absolute zeta potential of greater than ±60 mV.

11. A passively impact resistant composite electrolyte composition in accordance with claim 1 wherein said shear thickening ceramic particles are essentially free of materials that volatilize at 80° C.

12. A passively impact resistant composite electrolyte composition in accordance with claim 11 wherein said shear thickening ceramic particles are essentially free of materials that volatilize at 110° C.

13. A passively impact resistant composite electrolyte composition in accordance with claim 12 wherein said shear thickening ceramic particles are essentially free of materials that volatilize at 120° C.

14. A passively impact resistant composite electrolyte composition in accordance with claim 1 wherein said shear thickening ceramic particles are present in the composition in an amount in the range of 20 to 40 weight percent.

15. A passively impact resistant composite electrolyte composition in accordance with claim 1 wherein said electrolyte solvent comprises at least one material selected from the group consisting of ethylene carbonate, dimethyl carbonate, propylene carbonate, dimethoxyethane, dioxolane, ethyl methyl carbonate, and an ionic liquid.

16. A passively impact resistant composite electrolyte composition in accordance with claim 1 wherein said electrolyte salt comprises at least one material selected from the group consisting of lithium hexafluorophosphate, lithium triflate, lithium perchlorate, lithium tetrafluoro borate, lithium hexafluoro lithium arsenate, lithium bis(trifluoromethane sulphone)imide, lithium bis(oxalate) borate, sodium perchlorate, sodium tetrafluoro borate, sodium hexafluoro arsenate, sodium bis(trifluoromethane sulphone) imide, sodium bis(oxalate) borate.

17. A passively impact resistant composite electrolyte composition in accordance with claim 1 wherein said shear thickening ceramic is functionalized with at least one material selected from the group consisting of a stryenic, an acrylate, a methacrylate, a vinyl ester, an acrylamide, a methacrylamide, an acrylonitrile, N-vinyl carbazole, and N-vinyl pyrrolidone.

18. A passively impact resistant laminated battery comprising: an anode; a cathode; and a passively impact resistant composite electrolyte disposed between said anode and said cathode, said electrolyte comprising a passively impact resistant composite electrolyte composition comprising an electrolyte solvent, up to 2M of an electrolyte salt, and shear thickening ceramic particles, said shear thickening ceramic particles having a polydispersity index of no greater than 0.1, an average particle size in a range of 50 nm to 1 μm, and an absolute zeta potential of greater than ±40 mV.

19. A passively impact resistant laminated battery in accordance with claim 18 wherein said shear thickening ceramic particles comprise at least one material selected from the group consisting of $TiO_2$, $Al_2O_3$, $ZrO_2$, $Y_2O_3$, $HfO_2$, $GeO_2$, $Sc_2O_3$, $CeO_2$, MgO, and $SiO_2$.

20. A passively impact resistant laminated battery in accordance with claim 19 wherein said shear thickening ceramic particles comprise silica.

21. A method of making a passively impact resistant composite electrolyte composition comprising the steps of:
 a. Preparing shear thickening ceramic particles so that said shear thickening ceramic particles have a polydispersity index of no greater than 0.1, an average particle size of in a range of 50 nm to 1 μm, and an absolute zeta potential of greater than ±40 mV;
 b. Heat treating said shear thickening ceramic particles under negative pressure at a temperature of at least 80° C. to drive off volatile materials; and
 c. combining said heat treated shear thickening ceramic particles with an electrolyte solvent and up to 2M of an electrolyte salt to make a composite electrolyte that comprises shear thickening ceramic particles in an amount in the range of 20 to 40 weight percent.

22. A method of making a passively impact resistant composite electrolyte composition in accordance with claim 21 wherein said shear thickening ceramic particles comprise at least one material selected from the group consisting of $TiO_2$, $Al_2O_3$, $ZrO_2$, $Y_2O_3$, $HfO_2$, $GeO_2$, $Sc_2O_3$, $CeO_2$, MgO, and $SiO_2$.

23. A method of making a passively impact resistant composite electrolyte composition in accordance with claim 22 wherein said shear thickening ceramic particles comprise silica.

24. A method of making a passively impact resistant composite electrolyte composition in accordance with claim 23 wherein said silica particles are derived from a Stöber process.

25. A method of making a passively impact resistant composite electrolyte composition in accordance with claim 23 wherein said silica particles are derived from diatomaceous earth.

* * * * *